(12) United States Patent
Matsuoh et al.

(10) Patent No.: US 11,243,518 B2
(45) Date of Patent: Feb. 8, 2022

(54) COMPUTER PROGRAM PRODUCTION SYSTEM, COMPUTER PROGRAM, AND PRODUCTION TERMINAL INSTRUMENT

(71) Applicant: CITIZEN WATCH CO., LTD., Tokyo (JP)

(72) Inventors: Daisuke Matsuoh, Tokyo (JP); Ryutaro Uemura, Tokyo (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 0 days.

(21) Appl. No.: 17/259,740

(22) PCT Filed: May 14, 2019

(86) PCT No.: PCT/JP2019/019051
§ 371 (c)(1),
(2) Date: Jan. 12, 2021

(87) PCT Pub. No.: WO2020/021818
PCT Pub. Date: Jan. 30, 2020

(65) Prior Publication Data
US 2021/0132918 A1    May 6, 2021

(30) Foreign Application Priority Data

Jul. 27, 2018  (JP) .............................. JP2018-141347
Feb. 28, 2019  (JP) .............................. JP2019-035437

(51) Int. Cl.
*G06F 9/44* (2018.01)
*G05B 19/418* (2006.01)
(Continued)

(52) U.S. Cl.
CPC ......... *G05B 19/41865* (2013.01); *G06F 8/36* (2013.01); *G05B 19/402* (2013.01);
(Continued)

(58) Field of Classification Search
CPC ................... G06Q 40/06; G06Q 10/06; G06Q 10/063112; G05B 19/41865; G05B 19/402; G06F 8/36
See application file for complete search history.

(56) References Cited

U.S. PATENT DOCUMENTS

2010/0269090 A1    10/2010 Le Merrer
2013/0275338 A1*   10/2013 Hosoda ................ G06Q 40/06
                                              705/36 R
(Continued)

FOREIGN PATENT DOCUMENTS

| JP | 5-241707 A | 9/1993 |
|----|------------|--------|
| JP | 2002-120174 A | 4/2002 |
| JP | 2017-27473 A | 2/2017 |

OTHER PUBLICATIONS

Communication dated Oct. 27, 2020 by the Japanese Patent Office in Application No. 2019-035437.
(Continued)

*Primary Examiner* — Tuan A Vu
(74) *Attorney, Agent, or Firm* — Sughrue Mion, PLLC

(57) ABSTRACT

A computer program production system, a computer program, and a production terminal instrument each cause a computer to execute service block selection processing of selecting a service block program from among selection candidate service block programs, trigger block selection processing of selecting a trigger block program from among selection candidate trigger block programs, action block selection processing of selecting an action block program from among selection candidate action block programs, and production processing of producing an application program by combining the selected block programs.

20 Claims, 25 Drawing Sheets

(51) Int. Cl.
    *G06F 8/36*     (2018.01)
    *G05B 19/402*     (2006.01)
    *G06Q 10/06*     (2012.01)
    *G06Q 40/06*     (2012.01)

(52) U.S. Cl.
    CPC ..... *G06Q 10/06* (2013.01); *G06Q 10/063112* (2013.01); *G06Q 40/06* (2013.01)

(56) References Cited

U.S. PATENT DOCUMENTS

| | | | | |
|---|---|---|---|---|
| 2014/0108079 | A1* | 4/2014 | Wright | G06Q 10/063112 705/7.14 |
| 2014/0277677 | A1* | 9/2014 | Ito | G05B 19/402 700/114 |
| 2014/0358271 | A1* | 12/2014 | Asakawa | G05B 19/41865 700/112 |
| 2015/0120354 | A1* | 4/2015 | Akita | G06Q 10/06 705/7.15 |
| 2016/0378439 | A1 | 12/2016 | Straub et al. | |

OTHER PUBLICATIONS

Communication dated Jan. 19, 2021 by the Japanese Patent Office in Application No. 2019-035437.
International Search Report dated Aug. 6, 2019 from the International Searching Authority in International Application No. PCT/JP2019/019051.
Written Opinion dated Aug. 6, 2019 from the International Bureau in International Application No. PCT/JP2019/019051.
Shotaro Akiyama et al. "An On-site Programming Environment Considering User Contexts for Wearable Computing", Information Processing Society of Japan, Symposium series, Multimedia, Dispersion, Cooperation and Mobile (DIC0M02010), Symposium Proceedings, vol. 2010, No. 1, 2010, pp. 1992-2000 (11 pages total).
Nobuyuki Yashima, "Complete Introduction for IFTTT to become a man who can make a mutter and share information fully automatically", Weekly ASCII, vol. 27, No. 1024, Japan, Kadokawa Corporation, Apr. 2015, pp. 80-85 (9 pages total).
Genichiro Ohashi, "'Innermost Secrets for Automation of Personal Computers', 'To save time required for routine work instantly'", , Nikkei Personal Computing, No. 708, Japan, Nikkei Business Publications, Inc., Oct. 27, 2014, pp. 26-55 (33 pages total).

* cited by examiner

COMPUTER PROGRAM PRODUCTION SYSTEM, COMPUTER PROGRAM, AND PRODUCTION TERMINAL INSTRUMENT

CROSS REFERENCE TO RELATED APPLICATIONS

This application is a National Stage of International Application No. PCT/JP2019/019051 filed May 14, 2019, claiming priority based on Japanese Patent Application No. 2018-141347 filed Jul. 27, 2018 and 2019-035437 filed Feb. 28, 2019, the entire contents of which are incorporated herein by reference.

FIELD

The present invention relates to a computer program production system, a computer program, and a production terminal instrument.

BACKGROUND

For example, Patent Literature 1 discloses, as a technology related to a conventional computer program production system, an authoring system for supporting production and editing of the behavior of a multijoint structural body.

CITATION LIST

Patent Literature

Patent Literature 1: Japanese Patent Application Laid-open No. 2002-120174

SUMMARY

Technical Problem

Meanwhile, recently, to use an instrument having a predetermined function, such as a watch, in more various manners, an application program for operating the instrument in various manners is used in some cases, and it has been desired to easily produce such an application program.

The present invention has been made in view of the above-described circumstance, and an object thereof is to provide a computer program production system, a computer program, and a production terminal instrument that can easily produce an application program configured to operate an operation target instrument.

Solution to Problem

In order to solve the above mentioned problem, a computer program production system according to the present invention includes an external instrument configured to store production information for producing an application program configured to operate an operation target instrument; and a production terminal instrument including a communication unit configured to perform communication with the external instrument, an input unit configured to receive an input from outside, and a processing unit configured to execute processing of producing the application program in accordance with the input to the input unit based on the production information acquired from the external instrument through the communication unit, wherein the application program includes a service block program configured to define output information to be output from the operation target instrument, a trigger block program configured to define contents of a trigger that invokes an action for outputting the output information, define a trigger generation unit that generates the trigger, and cause the trigger generation unit to generate the trigger, and an action block program configured to define contents of the action for outputting the output information, define an action execution unit that executes the action, and cause the action execution unit to execute the action, and the processing unit executes information acquisition processing of acquiring the production information from the external instrument through the communication unit, service block selection processing of selecting the service block program to be incorporated in the application program from among selection candidate service block programs as selection candidates for the service block program in accordance with the production information acquired by the information acquisition processing and the input to the input unit, trigger block selection processing of selecting the trigger block program to be incorporated in the application program from among selection candidate trigger block programs as selection candidates for the trigger block program in accordance with the production information acquired by the information acquisition processing and the input to the input unit, action block selection processing of selecting the action block program to be incorporated in the application program from among selection candidate action block programs as selection candidates for the action block program in accordance with the production information acquired by the information acquisition processing and the input to the input unit, and production processing of producing the application program by combining the service block program selected by the service block selection processing, the trigger block program selected by the trigger block selection processing, and the action block program selected by the action block selection processing.

Further, in the computer program production system, it is possible to configure that the application program is stored in any of a plurality of the operation target instruments and causes the operation target instruments to cooperate with each other to perform generation of the trigger by the trigger generation unit, acquisition of the output information, and execution of the action by the action execution unit.

Further, in the computer program production system, it is possible to configure that the production terminal instrument is also used as the operation target instrument, and the application program causes the production terminal instrument also used as the operation target instrument to perform at least one or all of generation of the trigger by the trigger generation unit, acquisition of the output information, and execution of the action by the action execution unit.

Further, in the computer program production system, it is possible to configure that the processing unit executes the trigger block selection processing and the action block selection processing after the service block selection processing.

Further, in the computer program production system, it is possible to configure that the information acquisition processing includes service block information acquisition processing of acquiring, as the production information, information related to the selection candidate service block programs, trigger block information acquisition processing of acquiring, as the production information, information related to the selection candidate trigger block programs in accordance with the operation target instrument, and action block information acquisition processing of acquiring, as the production information, information related to the selection candidate action block program in accordance with the operation target instrument.

Further, in the computer program production system, it is possible to configure that the processing unit executes product code transmission processing of transmitting a product code specifying a model of the operation target instrument to the external instrument through the communication unit, acquires, in the trigger block information acquisition processing, information related to the selection candidate trigger block programs in accordance with the product code transmitted by the product code transmission processing, and acquires, in the action block information acquisition processing, information related to the selection candidate action block program in accordance with the product code transmitted by the product code transmission processing.

Further, in the computer program production system, it is possible to configure that the operation target instrument includes an electronic watch configured to display time.

Further, in the computer program production system, it is possible to configure that the production terminal instrument includes a display unit controlled by the processing unit and capable of displaying an image, when selecting the service block program from among the selection candidate service block programs at the service block selection processing, the processing unit causes the display unit to display a service narrowing option image representing a service narrowing option for narrowing the selection candidate service block programs and an icon image representing each selection candidate service block program narrowed by the service narrowing option, when selecting the trigger block program from among the selection candidate trigger block programs at the trigger block selection processing, the processing unit causes the display unit to display a trigger narrowing option image representing a trigger narrowing option for narrowing the selection candidate trigger block programs, and an icon image representing each selection candidate trigger block program narrowed by the trigger narrowing option, when selecting the action block program from among the selection candidate action block programs at the action block selection processing, the processing unit causes the display unit to display an action narrowing option image representing an action narrowing option for narrowing the selection candidate action block program, and an icon image representing each selection candidate action block program narrowed by the action narrowing option, and the processing unit causes the display unit to display the service narrowing option image, the trigger narrowing option image, and the action narrowing option image and not to display the icon images on a screen on which an operation to start production of the application program is performed before the production processing after the service block selection processing, the trigger block selection processing, and the action block selection processing.

In order to solve the above mentioned problem, a computer program according to the present invention is configured to cause a computer to execute: information acquisition processing of acquiring, from an external instrument through a communication unit of the computer, production information for producing an application program configured to operate an operation target instrument, the application program including a service block program configured to define output information to be output from the operation target instrument, a trigger block program configured to define contents of a trigger that invokes an action for outputting the output information, define a trigger generation unit that generates the trigger, and cause the trigger generation unit to generate the trigger, and an action block program configured to define contents of the action for outputting the output information, define an action execution unit that executes the action, and cause the action execution unit to execute the action; service block selection processing of selecting the service block program to be incorporated in the application program from among selection candidate service block programs as selection candidates for the service block program in accordance with the production information acquired by the information acquisition processing and an input to an input unit of the computer; trigger block selection processing of selecting the trigger block program to be incorporated in the application program from among selection candidate trigger block programs as selection candidates for the trigger block program in accordance with the production information acquired by the information acquisition processing and the input to the input unit; action block selection processing of selecting the action block program to be incorporated in the application program from among selection candidate action block programs as selection candidates for the action block program in accordance with the production information acquired by the information acquisition processing and the input to the input unit; and production processing of producing the application program by combining the service block program selected by the service block selection processing, the trigger block program selected by the trigger block selection processing, and the action block program selected by the action block selection processing.

Further, in the computer program, it is possible to configure that the application program is stored in any of a plurality of the operation target instruments and causes the operation target instruments to cooperate with each other to perform generation of the trigger by the trigger generation unit, acquisition of the output information, and execution of the action by the action execution unit.

Further, in the computer program, it is possible to configure that the computer is also used as the operation target instrument, and the application program causes the computer also used as the operation target instrument to perform at least one or all of generation of the trigger by the trigger generation unit, acquisition of the output information, and execution of the action by the action execution unit.

Further, in the computer program, it is possible to configure that when selecting the service block program from among the selection candidate service block programs at the service block selection processing, the computer program causes a display unit of the computer to display a service narrowing option image representing a service narrowing option for narrowing the selection candidate service block programs and an icon image representing each selection candidate service block program narrowed by the service narrowing option, when selecting the trigger block program from among the selection candidate trigger block programs at the trigger block selection processing, the computer program causes the display unit to display a trigger narrowing option image representing a trigger narrowing option for narrowing the selection candidate trigger block programs and an icon image representing each selection candidate trigger block program narrowed by the trigger narrowing option, when selecting the action block program from among the selection candidate action block programs at the action block selection processing, the computer program causes the display unit to display an action narrowing option image representing an action narrowing option for narrowing the selection candidate action block programs and an icon image representing each selection candidate action block program narrowed by the action narrowing option, and the computer program causes the display unit to display the service narrowing option image, the trigger narrowing option image, and the action narrowing option image and not to display the icon images on a screen on which an operation to start production of the application program is performed before the production processing after the service block selection processing, the trigger block selection processing, and the action block selection processing.

In order to solve the above mentioned problem, a production terminal instrument according to the present invention includes a communication unit configured to perform communication with an external instrument configured to store production information for producing an application program configured to operate an operation target instrument; an input unit configured to receive an input from outside; and a processing unit configured to execute processing of producing the application program in accordance with the input to the input unit based on the production information acquired from the external instrument through the communication unit, wherein the application program includes a service block program configured to define output information to be output from the operation target instrument, a trigger block program configured to define contents of a trigger that invokes an action for outputting the output information, define a trigger generation unit that generates the trigger, and cause the trigger generation unit to generate the trigger, and an action block program configured to define contents of the action for outputting the output information, define an action execution unit that executes the action, and cause the action execution unit to execute the action, and the processing unit executes information acquisition processing of acquiring the production information from the external instrument through the communication unit, service block selection processing of selecting the service block program to be incorporated in the application program from among selection candidate service block programs as selection candidates for the service block program in accordance with the production information acquired by the information acquisition processing and the input to the input unit, trigger block selection processing of selecting the trigger block program to be incorporated in the application program from among selection candidate trigger block programs as selection candidates for the trigger block program in accordance with the production information acquired by the information acquisition processing and the input to the input unit, action block selection processing of selecting the action block program to be incorporated in the application program from among selection candidate action block programs as selection candidates for the action block program in accordance with the production information acquired by the information acquisition processing and the input to the input unit, and production processing of producing the application program by combining the service block program selected by the service block selection processing, the trigger block program selected by the trigger block selection processing, and the action block program selected by the action block selection processing.

Advantageous Effects of Invention

In a computer program production system, a computer program, and a production terminal instrument according to the present invention, a processing unit of the production terminal instrument can execute information acquisition processing, service block selection processing, trigger block selection processing, action block selection processing, and production processing. Accordingly, the computer program production system, the computer program, and the production terminal instrument can produce an application program including a service block program, a trigger block program, and an action block program by selecting and combining the programs disassembled in the units of blocks. As a result, the computer program production system, the computer program, and the production terminal instrument can easily produce the application program configured to operate an operation target instrument.

DESCRIPTION OF EMBODIMENTS

An embodiment according to the present invention will be described below in detail with reference to the accompanying drawings. The present invention is not limited by the present embodiment. Components in the embodiment described below include those that can be replaced and easily thought of by the skilled person in the art or those identical in effect.

Embodiment

<Overview of Computer Program Production System>

Figure 1:
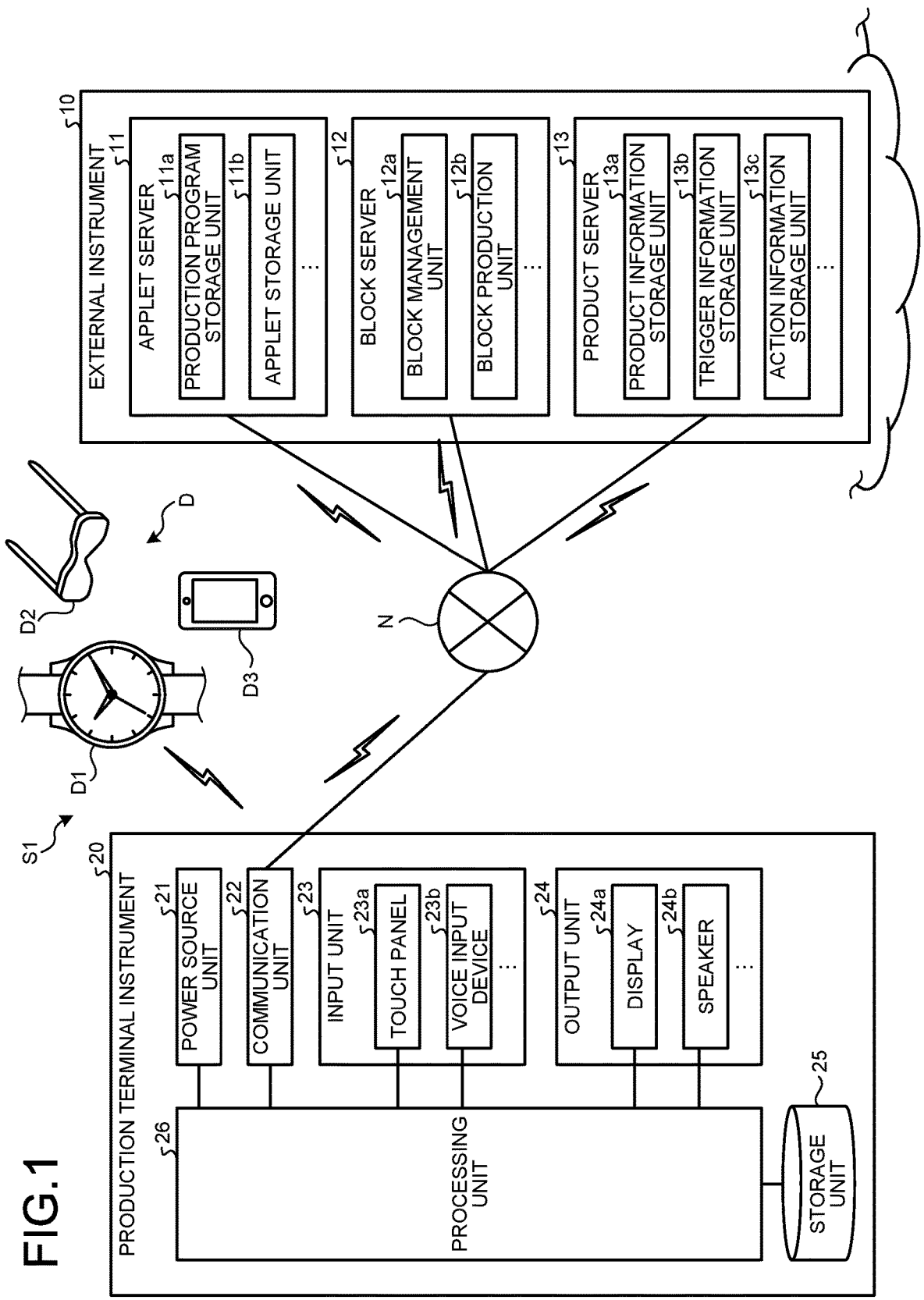
FIG. 1 is a block diagram of a schematic configuration of a computer program production system according to an embodiment.

A computer program production system S1 of the present embodiment illustrated in FIG. 1 is a system that includes an external instrument 10 and a production terminal instrument 20, and can easily produce an application program for using an operation target instrument D in various manners as the instruments mutually communicate and cooperate. The external instrument 10 is included in a cloud service instrument (cloud server) implemented on a network N. The production terminal instrument 20 is an electronic device that can receive various cloud services from the external instrument 10 through mutual communication and cooperation with the external instrument 10. The production terminal instrument 20 produces an application program in cooperation with the external instrument 10. The production terminal instrument 20 can be achieved by, for example, a smartphone, a tablet PC, a laptop PC, or a desktop PC. The operation target instrument D is an electronic device that is portable by a user and operated by the application program produced by the production terminal instrument 20. The operation target instrument D can be achieved by, for example, a smartphone, a tablet PC, a laptop PC, a PDA, or a portable game machine but typically preferably includes a wearable instrument that is smaller than the production terminal instrument 20 and attachable to a human body. Examples of the wearable instrument include a wrist-band instrument, a glass instrument, a finger-ring instrument, a shoe wearable instrument, and a pendant instrument. In the example illustrated in FIG. 1, the operation target instrument D is, for example, an electronic watch (wristwatch) D1 that is a wrist-band wearable instrument and displays time, a glass wearable instrument D2, or a smartphone D3. The above-described production terminal instrument 20 may be also used as the operation target instrument D.

Typically, the external instrument 10 and the production terminal instrument 20 mutually communicate through the network N. In contrast, the production terminal instrument 20 and the operation target instrument D mutually communicate through short-distance communication. The network N is achieved by an optional communication network of wireless communication through Wi-Fi (registered trademark), 4G, 5G, or the like or wired communication through a communication line, and connects the external instrument 10 and the production terminal instrument 20 to perform communication therebetween. The scheme of short-distance communication is, for example, Bluetooth (registered trademark), W-LAN, Wi-Fi (registered trademark), or Near Field Communication (NFC). However, the operation target instrument D is not limited to short-distance communication but may have a configuration that allows mutually communication with the external instrument 10 and the production terminal instrument 20 through the network N. The following describes in detail components of the computer program production system S1 with reference to the accompanying drawings.

<Basic Configuration of Production Target Application Program (Applet)>

The following first describes an application program produced by the computer program production system S1. Typically, the application program is a relatively small computer program that is incorporated and executed in another application program such as a browser of the operation target instrument D. Herein, one example in which the application program is an applet executed on a browser is described. Typically, the applet is defined to be an application program having a predetermined sequence. In the following description, the application program produced by the computer program production system S1 is also referred to as an "applet".

The applet of the present embodiment is a computer program executed by the operation target instrument D to operate the operation target instrument D. The applet may be a computer program configured to cause the operation target instrument D to perform a predetermined operation or may be a computer program configured to cause a plurality of the operation target instruments D to cooperate with each other to perform a predetermined operation. The applet of the present embodiment includes a service block program, a trigger block program, and an action block program, and these three elements are combined to establish one applet. In the following description, the service block program is also referred to as a "service block", the trigger block program is also referred to as a "trigger block", and the action block program is also referred to as an "action block".

The service block is a computer program that defines output information to be output from the operation target instrument D depending on a service content in accordance with a purpose desired by the user. In other words, the service block is a computer program that specifies the contents of output information to be acquired in accordance with a service content.

The trigger block is a computer program configured to define the contents of a trigger that invokes an action for outputting the output information in accordance with a service content, define a trigger generation unit that generates the trigger, and cause the trigger generation unit to generate the trigger. The trigger invokes an action in accordance with the contents of the service and is generated by the trigger generation unit. The trigger generation unit is provided to the operation target instrument D and generates the trigger. Examples of those (trigger generation unit candidates) that serve as the trigger generation unit in the operation target instrument D include an input unit, a detection unit, and a time measurement unit of the operation target instrument D. The input unit of the operation target instrument D is a portion that receives various kinds of inputs to the operation target instrument D. This input unit 23 includes, for example, a touch panel that receives an operation input to the operation target instrument D, an operation button, and a voice input device that receives a voice input to the operation target instrument D. When the operation target instrument D is the electronic watch D1, the input unit may include a crown, a push button, a register ring, and the like. The detection unit of the operation target instrument D is a detector that detects various kinds of information. The detection unit includes, for example, an acceleration sensor that detects acceleration acting on the operation target instrument D, an illuminance sensor that detects the illuminance of light incident on the operation target instrument D, a temperature sensor that detects the temperature in the vicinity of the operation target instrument D, a voltage sensor that detects power voltage and power generation of the operation target instrument D, and a positioning sensor that measures the current position of the operation target instrument D. The time measurement unit of the operation target instrument D is a circuit that measures time (instrument internal time). The time measurement unit includes, for example, an oscillator, an oscillation circuit, a compensation circuit, and a divider circuit, generates a clock signal having a predetermined frequency as a reference of time measurement inside the operation target instrument D, and counts pulses included in the clock signal, thereby performing time measurement. Examples of the trigger generated by the trigger generation unit include a predetermined input to the touch panel, the voice input device, the crown, the push button, or the register ring, which are included in the input unit, detection of predetermined information by the acceleration sensor, the illuminance sensor, the temperature sensor, the voltage sensor, or the positioning sensor, which are included in the detection unit, and a result of time measurement by the time measurement unit. As the applet including the trigger block is executed by a control unit of the operation target instrument D, the trigger block causes the trigger generation unit defined by the trigger block to generate the trigger.

The action block is a computer program configured to define the contents of an action for outputting the output information in accordance with a service content and an action execution unit that executes the action and cause the action execution unit to execute the action. Herein, the action is an operation in accordance with the contents of a service provided by the applet and is executed by the action execution unit. The action execution unit is provided to the operation target instrument D and executes the action. Examples of those (action execution unit candidates) that serve as the action execution unit in the operation target instrument D include a communication unit and an output unit of the operation target instrument D. The communication unit of the operation target instrument D is a communication module that can communicate with the outside of the operation target instrument D. The communication unit may communicate with the outside through short-distance communication or may be connected with the network N of wireless communication or wired communication to perform communication therebetween and communicate with the outside through the network N. The output unit of the operation target instrument D is a portion that performs various kinds of outputting at the operation target instrument D. The output unit includes, for example, a display that outputs image information, a display lamp that outputs visual information, a speaker or alarm buzzer that outputs audio information, and a vibrator that outputs vibration information. When the operation target instrument D is the electronic watch D1, the output unit may include physical hands, a date plate, a drive unit, and the like for displaying time, date, and the like. Examples of the action executed by the action execution unit include outputting of the output information to the outside by the communication unit and outputting of the output information by the display, the display lamp, the speaker or alarm buzzer, the vibrator, the hands, the date plate, and the drive unit included in the output unit. As the applet including the action block is executed by the control unit of the operation target instrument D, the action block causes the action execution unit defined by the action block to execute the action for outputting the output information.

The applet configured as described above includes the service block, the trigger block, and the action block as described above and associates and defines the output information, the trigger, and the action in accordance with the contents of a service. For example, the applet may be stored in a storage unit of the operation target instrument D through the network N or short-distance communication. Alternatively, when a plurality of the operation target instruments D are operated in cooperation, the applet may be collectively stored in any of the operation target instruments D or may be stored in the operation target instruments D in a distributed manner. Alternatively, the applet may be produced by the production terminal instrument 20 to be described later and stored in a storage unit of the production terminal instrument 20 when the production terminal instrument 20 is also used as an operation target instrument D to be operated by the applet. As the applet is executed by the control unit of the operation target instrument D, the trigger generated by the trigger generation unit can cause the action execution unit to execute the action for outputting the output information in accordance with service contents.

When causing the operation target instrument D to perform a predetermined operation, the applet is stored in the operation target instrument D and causes the operation target instrument D to perform generation of the trigger by the trigger generation unit, acquisition of the output information, and execution of the action by the action execution unit. In this case, for example, upon the trigger generation by the operation target instrument D, the applet causes the operation target instrument D to execute the action of acquiring the output information in accordance with service contents from the external instrument and outputting the acquired output information in accordance with the service contents. When causing a plurality of the operation target instruments D to cooperate with each other to perform a predetermined operation, the applet is stored in any of the operation target instruments D and causes the operation target instruments D to cooperate with each other to perform generation of the trigger by the trigger generation unit, acquisition of the output information, and execution of the action by the action execution unit. In addition, when the production terminal instrument 20 is also used as an operation target instrument D, the applet causes the production terminal instrument 20 also used as the operation target instrument D to perform at least one or all of generation of the trigger by the trigger generation unit, acquisition of the output information, and execution of the action by the action execution unit. In this case, for example, upon trigger generation by a first operation target instrument D, the applet causes a second operation target instrument D (for example, the production terminal instrument 2) to execute the action of acquiring the output information in accordance with service contents from the external instrument in response to the trigger and transmitting the acquired output information to the first operation target instrument D and causes the first operation target instrument D to execute the action of outputting the output information in accordance with the service contents. In the applet, the service block, the trigger block, and the action block may each include a plurality of block programs. In other words, in one applet, a plurality of pieces of output information may be defined by the service block, a plurality of triggers may be defined by the trigger block, and a plurality of actions may be defined by the action block. Accordingly, the applet can cause the operation target instruments D to perform a repetitive operation using the triggers, the pieces of output information in accordance with service contents, and the actions of outputting the pieces of output information.

Specific Example of Operation Using Applet

The following describes an example in which the output information in accordance with the contents of a service provided by the applet is "information of weather after one hour", the trigger that invokes the action (in other words, the trigger that invokes acquisition of the output information) is a "pressdown operation of the push button of the electronic watch D1", and the contents of the action for outputting the output information in accordance with the contents of the service are "display by driving the hands of the electronic watch D1". In this example, the operation target instruments D are the electronic watch D1 and the smartphone D3 (may be also used as the production terminal instrument 20). In this case, when a pressdown operation is performed on the push button (trigger generation unit) by the user while the applet is activated and executed, the communication unit of the electronic watch D1 transmits an output information acquisition signal to the smartphone D3 in response to the pressdown operation. When the output information acquisition signal from the electronic watch D1 is received by the communication unit of the smartphone D3, the smartphone D3 queries an external instrument (for example, a server) through the communication unit for weather information and acquires information of weather at the current position after one hour as the output information from the external instrument. Then, the smartphone D3 transmits the acquired information of weather at the current position after one hour or action instruction information in accordance with the information of weather to the electronic watch D1 through the communication unit as the output information. Then, having received the output information through the communication unit thereof, the electronic watch D1 operates the hands (the action execution unit) in accordance with the information of weather at the current position after one hour or the action instruction information in accordance with the information of weather to execute the action of displaying (outputting) the information of weather at the current position after one hour.

First Modification of Specific Example of Operation Using Applet

In the above-described specific example, the applet causes a single operation target instrument D (electronic watch D1) to perform the trigger generation and the action execution, but the present invention is not limited thereto, and the trigger generation and the action execution may be performed by different operation target instruments D. For example, in a modification of the above-described specific example, the applet may cause the electronic watch D1 to perform the trigger generation as described above and cause the smartphone D3 to perform the action execution. In this case, the smartphone D3 may transmit no output information acquired from the external instrument to the electronic watch D1, and the display (action execution unit) included in the output unit may execute the action of displaying (outputting) the information of weather at the current position after one hour as the output information. Similarly, in another modification, the applet may cause the smartphone D3 to perform the trigger generation and the action execution or may cause the smartphone D3 to perform the trigger generation and cause the electronic watch D1 to perform the action execution. In another modification of the above-described specific example, for example, the applet may cause the electronic watch D1 to perform the trigger generation as described above, cause the smartphone D3 to perform the output information acquisition, and cause the glass wearable instrument D2 to perform the action execution.

Second Modification of Specific Example of Operation Using Applet

As described above, in the applet, the service block, the trigger block, and the action block may each include a plurality of block programs. In other words, in one applet, a plurality of pieces of the output information may be defined by the service block, a plurality of triggers may be defined by the trigger block, and a plurality of actions may be defined by the action block. For example, the output information in accordance with the contents of a service provided by the applet is "the achievement rate of today's exercise amount" and a "music piece in accordance with the achievement rate of the exercise amount", the trigger that invokes an action (in other words, the trigger that invokes acquisition of the output information) is a "pressdown operation of the push button of the electronic watch D1", and the contents of the action for outputting the output information in accordance with the contents of the service are "display by driving the hands of the electronic watch D1" and "outputting from the speaker of the smartphone D3 (or a headphone connected with the smartphone D3)". In this example, the operation target instruments D are the electronic watch D1 and the smartphone D3 (may be also used as the production terminal instrument 20). In this case, when a pressdown operation is performed on the push button (the trigger generation unit) by the user while the applet is activated and executed, the control unit of the electronic watch D1 calculates the achievement rate of today's exercise amount using a result of detection by the acceleration sensor or the like in response to the pressdown operation. Then, the electronic watch D1 executes a first action of operating the hands (the action execution unit) and displaying (outputting) information of the calculated achievement rate of today's exercise amount as first output information in percentage (%) or the like. In addition, the electronic watch D1 transmits the output information acquisition signal in accordance with the calculated achievement rate of today's exercise amount also to the smartphone D3. Having received the output information acquisition signal from the electronic watch D1 through the communication unit of the smartphone D3, the smartphone D3 selects a music piece in accordance with the achievement rate of today's exercise amount from among music pieces stored in the storage unit of the smartphone D3 using the output information acquisition signal (for example, selects Music Piece A set in advance when the achievement rate is 50%, or selects Music Piece B in advance set when the achievement rate is 90%). Then, the smartphone D3 executes a second action of outputting the selected music piece as second output information from the speaker or headphone (the action execution unit) included in the output unit. The smartphone D3 is not limited to the form of selecting a music piece in accordance with the achievement rate of today's exercise amount from among music pieces stored in the storage unit of the smartphone D3 using the output information acquisition signal but may query the external instrument through the communication unit for a music piece in accordance with the achievement rate of today's exercise amount and acquire the music piece.

Third Modification of Specific Example of Operation Using Applet

The applet may also cause only a single operation target instrument D, for example, the electronic watch D1 to execute the service block, the trigger block, and the action block. In this case, for example, when a pressdown operation is performed on the push button by the user while the applet is activated and executed, the electronic watch D1 may calculate information of the acceleration sensor built in the electronic watch D1 as the exercise amount (for example, the number of steps) and move the hands of the electronic watch D1 to positions corresponding to the exercise amount when the accumulated exercise amount has reached a value set by the user. Alternatively, the electronic watch D1 may operate a vibration alarm built in the electronic watch D1 in place of the above-described hand operation or may simultaneously perform the above-described hand operation and the vibration alarm operation.

Fourth Modification of Specific Example of Operation Using Applet

The applet may also cause a single operation target instrument D, for example, the electronic watch D1 to execute a plurality of service blocks, a plurality of trigger blocks, and a plurality of action blocks and accordingly, may cause the electronic watch D1 to perform a repetitive operation of repeating a plurality of actions of outputting a plurality of pieces of output information in accordance with service contents. In this case, for example, when a pressdown operation is performed on the push button by the user while the applet is activated and executed, the electronic watch D1 calculates information of the acceleration sensor built in the electronic watch D1 as the exercise amount (for example, the number of steps) and operates the vibration alarm each time the accumulated exercise amount reaches a predetermined value (for example, 2000 steps) set by the user. In addition, in this case, for example, the electronic watch D1 may cause the vibration alarm to perform an operation (first action) in Vibration Pattern 1 (first output information) upon the first achievement (first trigger) of 2000 steps, and thereafter cause the vibration alarm to perform an operation (second action) in Vibration Pattern 2 (second output information) upon the second achievement (second trigger) of 2000 steps. Alternatively, for example, the electronic watch D1 may transmit the exercise amount to the smartphone D3 in cooperation with the electronic watch D1 and may cause the smartphone D3 to perform outputting (first action) of Music Piece A (first output information) upon the first achievement (first trigger) of 2000 steps and to perform outputting (second action) of Music Piece B (second output information) upon the second achievement (second trigger) of 2000 steps. In other words, the applet may be configured so that an action is executed each time the trigger of a service is satisfied while the service is executed after the action is executed upon satisfaction of the trigger. In this case, the last trigger (for example, a goal at 10000 steps) of the service may be determined in advance, and the applet may be configured to end the repetitive operation when the last trigger is satisfied.

<Basic Configuration of External Instrument>

The following describes the external instrument 10. The external instrument 10 includes an electronic circuit mainly achieved by a publicly known microcomputer including a central processing unit such as a CPU, and various storage devices such as a semiconductor memory. The external instrument 10 may also be achieved by installing a computer program that achieves various kinds of processing on a computer system such as a known PC or work station. The external instrument 10 stores various kinds of production information for producing the above-described application program. The external instrument 10 of the present embodiment includes a plurality of instruments. Specifically, the external instrument 10 includes an applet server 11, a block server 12, and a product server 13.

The applet server 11 is a server for managing the applet. The applet server 11 functionally includes a production program storage unit 11a and an applet storage unit 11b.

The production program storage unit 11a is a storage region storing an applet production program as the production information. The applet production program is downloaded to the production terminal instrument 20 through the network N or the like and executed on the production terminal instrument 20 to cause the production terminal instrument 20 to execute various kinds of processing necessary for applet production. Alternatively, the applet production program may be accessed from the production terminal instrument 20 through a browser and executed on the applet server 11 to cause the production terminal instrument 20 to execute various kinds of processing necessary for applet production.

The applet storage unit 11*b* is a storage region storing an applet produced by the production terminal instrument 20. The applet produced by the production terminal instrument 20 is uploaded to the applet server 11 and stored and accumulated in the applet storage unit 11*b*. Similarly, the applet storage unit 11*b* can store an applet produced not by the production terminal instrument 20. The applet stored in the applet storage unit 11*b* may be published to a third party through the network N or the like. In this case, it may be selectable, for example, whether the applet stored in the applet storage unit 11*b* is published to the third party. The applet is usable by a producer having produced the applet when selected not to be published, or is usable by a third party including another user other than the producer having produced the applet when selected to be published.

The production program storage unit 11*a* and the applet storage unit 11*b* described above may be provided to the production terminal instrument 20. In other words, some or all functions of the applet server 11 may be achieved as part of the production terminal instrument 20.

The block server 12 is a server for managing various blocks included in the applet. The block server 12 functionally includes a block management unit 12*a* and a block production unit 12*b*.

The block management unit 12*a* is a portion that has a function to store and manage various kinds of blocks to be included in the applet. The block management unit 12*a* stores and manages, as the production information, a plurality of kinds of service blocks, a plurality of kinds of trigger blocks, and a plurality of kinds of action blocks. The various blocks managed by the block management unit 12*a* are selection candidate blocks that can be selected as blocks to be included in the applet when the applet is produced by the production terminal instrument 20. In the following description, a service block as a selection candidate is also referred to as a "selection candidate service block", a trigger block as a selection candidate is also referred to as a "selection candidate trigger block", and an action block as a selection candidate is also referred to as a "selection candidate action block", in some cases. The block management unit 12*a* stores and manages, for example, various blocks produced by the block production unit 12*b*. The block management unit 12*a* may also store and manage, for example, various blocks produced not by the block production unit 12*b* and uploaded through the network N. The block management unit 12*a* can manage various blocks by, for example, applying a category (major classification), a tab (middle classification), and the like to each block in accordance with service contents and the like so that the producer of the applet can easily select a block of a desired content.

Some or all selection candidate trigger blocks and selection candidate action blocks may be stored in and managed by the product server 13. Thus, the selection candidate trigger blocks and selection candidate action blocks may be managed by the product server 13 or may be managed by both of the block server 12 and the product server 13.

The block production unit 12*b* is a portion that has a function to produce various blocks stored in and managed by the block management unit 12*a*. The block production unit 12*b* produces a service block, a trigger block, and an action block in accordance with an input from the user of the applet, a business operator that provides a service by the applet, another business operator, or the like. The block production unit 12*b* stores various produced blocks in the block management unit 12*a*. The block production unit 12*b* may apply the above-described category, tab, and the like to each of the various produced blocks in accordance with an input from the user of the applet, the business operator that provides a service by the applet, another business operator, or the like.

The product server 13 is a server for managing information related to a product as an operation target instrument D. The product server 13 functionally includes a product information storage unit 13*a*, a trigger information storage unit 13*b*, and an action information storage unit 13*c*.

The product information storage unit 13*a* is a storage region storing a product code of the operation target instrument D. The product code is product identification information for specifying the model of the operation target instrument D or the like. The product information storage unit 13*a* stores the product codes of a plurality of operation target instruments D that can be the production targets of the applet.

The trigger information storage unit 13*b* is a storage region storing trigger information as the production information. The trigger information is various information related to a trigger block. The trigger information includes, for example, trigger generation unit candidate information and trigger content information. The trigger generation unit candidate information is information related to a trigger generation unit candidate that can serve as the trigger generation unit of an operation target instrument D. The trigger content information is information related to the contents of a trigger that can be generated by the trigger generation unit candidate. The trigger information storage unit 13*b* stores the trigger information in relation (association) with the corresponding product code stored in the product information storage unit 13*a*. The trigger information storage unit 13*b* associates each product code with the trigger generation unit candidate information and the trigger content information of the operation target instrument D specified by the product code and stores the trigger generation unit candidate information and the trigger content information as the trigger information. The trigger information stored in the trigger information storage unit 13*b* is also related (associated) with a selection candidate trigger block managed by the block management unit 12*a*. The trigger information storage unit 13*b* may include the selection candidate trigger block as the trigger information as described above.

The action information storage unit 13*c* is a storage region storing action information as the production information. The action information is various information related to an action block. The action information includes, for example, action execution unit candidate information and action content information. The action execution unit candidate information is information related to an action execution unit candidate that can serve as the action execution unit of an operation target instrument D. The action content information is information related to the contents of an action that can be executed by the action execution unit candidate. The action information storage unit 13*c* stores the action information in relation (association) with the corresponding product code stored in the product information storage unit 13*a*. The action information storage unit 13*c* associates each product code with the action execution unit candidate information and the action content information of an operation target instrument D specified by the product code and stores the action execution unit candidate information and the action content information as the action information. The action information stored in the action information storage unit 13*c* is also related (associated) with a selection candidate action block managed by the block management unit 12*a*. The action information storage unit 13*c* may include information of the selection candidate action block as the action information as described above.

<Basic Configuration of Production Terminal Instrument 20>

The following describes the production terminal instrument 20. The production terminal instrument 20 is a terminal that produces an applet using production information stored in the external instrument 10 through mutual communication and cooperation with the external instrument 10. The production terminal instrument 20 includes an electronic circuit mainly achieved by a publicly known microcomputer including a central processing unit such as a CPU, and various storage devices such as a semiconductor memory. The production terminal instrument 20 may also be achieved by installing a computer program that achieves various kinds of processing on a computer system such as a known PC or a work station. Specifically, the production terminal instrument 20 includes a power source unit 21, a communication unit 22, the input unit 23, an output unit 24, a storage unit 25, and a processing unit 26.

The power source unit 21 is an electrical power source of the production terminal instrument 20. The power source unit 21 includes a secondary battery that can be charged and discharged, such as a lithium ion battery, and supplies electrical power to each component in the production terminal instrument 20.

The communication unit 22 is a communication module that can communicate with the outside of the production terminal instrument 20. The communication unit 22 is connected with the network N of wireless communication or wired communication to perform communication therebetween and communicates with the external instrument 10 through the network N. The communication unit 22 also communicates with an operation target instrument D through short-distance wireless communication.

The input unit 23 is a portion that receives various kinds of inputs to the production terminal instrument 20. The input unit 23 includes, for example, a touch panel 23a that receives an operation input to the production terminal instrument 20, and a voice input device 23b that receives a voice input to the production terminal instrument 20. The input unit 23 may also include an input device such as a keyboard or a mouse pointer.

The output unit 24 is a portion that performs various kinds of outputting at the production terminal instrument 20. The output unit 24 includes, for example, a display 24a that outputs image information, a display lamp that outputs visual information, and a speaker 24b that outputs audio information.

The storage unit 25 is a storage device built in the production terminal instrument 20, such as a ROM, a RAM, or a semiconductor memory. The storage unit 25 stores conditions and information necessary for various kinds of processing at the production terminal instrument 20, various application programs executed by the production terminal instrument 20, control data, and the like. The storage unit 25 can also store various kinds of information received by the communication unit 22, various kinds of information input through the input unit 23, various kinds of information to be output from the output unit 24, and the like. The storage unit 25 stores, as various kinds of information received by the communication unit 22, for example, production information acquired from the external instrument 10 through the communication unit 22 to produce an applet. These pieces of information in the storage unit 25 are read as necessary by, for example, the processing unit 26.

The processing unit 26 is electrically connected with each component of the production terminal instrument 20 and collectively controls the components of the production terminal instrument 20. The processing unit 26 includes an electronic circuit mainly achieved by a publicly known microcomputer including a central processing unit such as a CPU. The processing unit 26 is connected with each component of the production terminal instrument 20 to perform communication therebetween and can mutually communicate various signals with the component. The processing unit 26 executes various application programs stored in the storage unit 25, operates each component of the production terminal instrument 20 through operation of the corresponding computer program, and executes various kinds of processing for achieving various kinds of functions.

<Various Kinds of Processing Related to Applet Production>

Based on the production information acquired from the external instrument 10 through the communication unit 22, the processing unit 26 of the present embodiment can execute processing of producing an applet in accordance with an input to the input unit 23.

Specifically, the processing unit 26 can execute information acquisition processing, service block selection processing, trigger block selection processing, action block selection processing, and production processing. The processing unit 26 executes these pieces of processing by executing the applet production program stored in the production program storage unit 11a. Typically, the processing unit 26 preferably executes the trigger block selection processing and the action block selection processing after the service block selection processing. The following first schematically describes each processing and then describes specific examples with reference to FIGS. 2 to 13.

<Information Acquisition Processing>

The information acquisition processing executed by the processing unit 26 is processing of acquiring the production information from the external instrument 10 through the communication unit 22. More specifically, the information acquisition processing includes service block information acquisition processing, trigger block information acquisition processing, and action block information acquisition processing. The service block information acquisition processing is processing of acquiring information related to selection candidate service blocks as the production information from the external instrument 10 through the communication unit 22. The trigger block information acquisition processing is processing of acquiring, as the production information from the external instrument 10 through the communication unit 22, information related to selection candidate trigger blocks in accordance with an operation target instrument D as the production target of the applet. The action block information acquisition processing is processing of acquiring, as the production information from the external instrument 10 through the communication unit 22, information related to selection candidate action blocks in accordance with the operation target instrument D as the production target of the applet. The processing unit 26 may continuously execute the service block information acquisition processing, the trigger block information acquisition processing, and the action block information acquisition processing or may execute each acquisition processing as necessary at stages.

Specifically, in the service block information acquisition processing, the processing unit 26 acquires, as the information related to selection candidate service blocks, information related to selection candidate service blocks managed by the block management unit 12a of the block server 12. In the trigger block information acquisition processing, the processing unit 26 acquires, as the information related to selection candidate trigger blocks, the trigger information (the trigger generation unit candidate information and the trigger content information) stored in the trigger information storage unit 13b of the product server 13 and information related to selection candidate trigger blocks managed by the block management unit 12a of the block server 12. In the action block information acquisition processing, the processing unit 26 acquires, as the information related to selection candidate action blocks, the action information (the action execution unit candidate information and the action content information) stored in the action information storage unit 13c of the product server 13 and information related to selection candidate action blocks managed by the block management unit 12a of the block server 12.

The processing unit 26 of the present embodiment executes product code transmission processing of transmitting a product code specifying the model of the operation target instrument D to the product server 13 through the communication unit 22. Then, in the trigger block information acquisition processing, the processing unit 26 acquires, from the product server 13 through the communication unit 22, the information related to selection candidate trigger blocks in accordance with the product code transmitted by the product code transmission processing. Similarly, in the action block information acquisition processing, the processing unit 26 acquires, from the product server 13 through the communication unit 22, the information related to selection candidate action blocks in accordance with the product code transmitted by the product code transmission processing.

<Service Block Selection Processing>

The service block selection processing executed by the processing unit 26 is processing of selecting a service block to be incorporated in the applet from among the selection candidate service blocks in accordance with the production information acquired by the information acquisition processing and an input to the input unit 23. In the service block selection processing, using the information related to selection candidate service blocks and acquired by the service block information acquisition processing, the processing unit 26 of the present embodiment selects a service block to be incorporated in the applet from among the selection candidate service blocks in accordance with an input to the input unit 23 by the producer.

<Trigger Block Selection Processing>

The trigger block selection processing executed by the processing unit 26 is processing of selecting a trigger block to be incorporated in the applet from among the selection candidate trigger blocks in accordance with the production information acquired by the information acquisition processing and an input to the input unit 23. In the trigger block selection processing, using the information related to selection candidate trigger blocks and acquired by the trigger block information acquisition processing, the processing unit 26 of the present embodiment selects a trigger block to be incorporated in the applet from among the selection candidate trigger blocks in accordance with an input to the input unit 23 by the producer.

<Action Block Selection Processing>

The action block selection processing executed by the processing unit 26 is processing of selecting an action block to be incorporated in the applet from among the selection candidate action blocks in accordance with the production information acquired by the information acquisition processing and an input to the input unit 23. In the action block selection processing, using the information related to selection candidate action blocks and acquired by the action block information acquisition processing, the processing unit 26 of the present embodiment selects an action block to be incorporated in the applet from among the selection candidate action blocks in accordance with an input to the input unit 23 by the producer.

<Production Processing>

The production processing executed by the processing unit 26 is processing of actually producing the applet by combining the service block selected by the service block selection processing, the trigger block selected by the trigger block selection processing, and the action block selected by the action block selection processing. In the production processing, the processing unit 26 of the present embodiment may produce the applet by combining, on the external instrument 10, the blocks each selected by the corresponding selection processing and may upload the produced applet to the applet storage unit 11b of the applet server 11. Alternatively, in the production processing, the processing unit 26 of the present embodiment may download the blocks each selected by the corresponding selection processing from the block server 12 and the product server 13 to the production terminal instrument 20, temporarily store the blocks in the storage unit 25, produce the applet, and then upload the produced applet to the applet storage unit lib of the applet server 11.

<Exemplary Applet Production Sequence>

Figure 2:
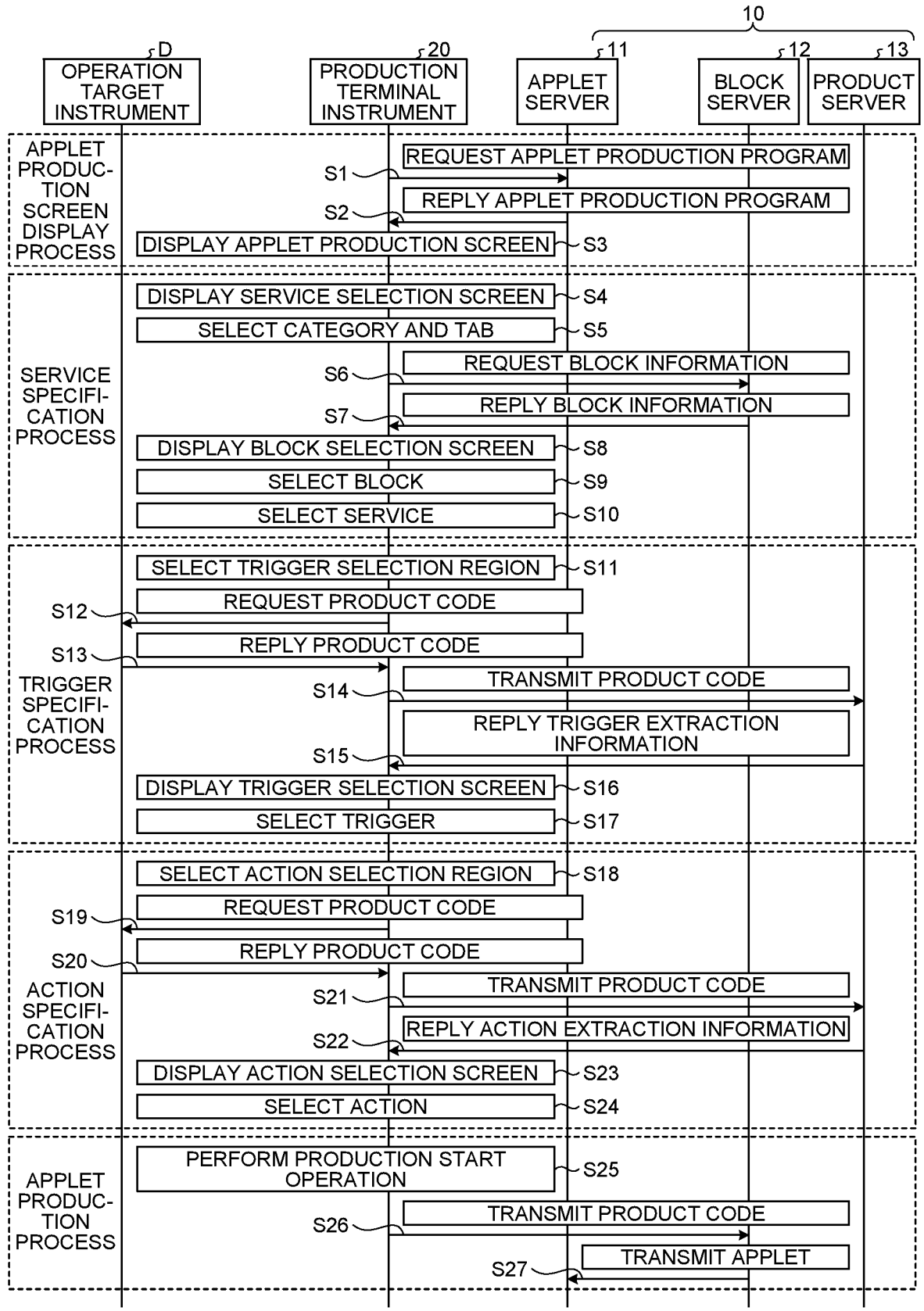
FIG. 2 is a diagram illustrating an exemplary process (sequence) of application program production by the computer program production system according to the embodiment.

The following describes an exemplary process of applet production by the computer program production system S1 with reference to FIG. 2. In the following description, FIGS. 3 to 13 are referred to as appropriate for exemplary display screens on the display 24a of the production terminal instrument 20.

First, the processing unit 26 of the production terminal instrument 20 transmits an applet production program request to the applet server 11 through the communication unit 22 and the network N in accordance with, for example, an input to the input unit 23 by the producer (step S1).

Having received the applet production program request from the production terminal instrument 20, the applet server 11 reads the applet production program stored in the production program storage unit 11a and replies the applet production program to the production terminal instrument 20 through the network N (step S2). When the production program storage unit 11a is provided to the production terminal instrument 20, the processing at steps S1 and S2 is unnecessary.

Having received the applet production program from the applet server 11, the processing unit 26 temporarily stores the applet production program in the storage unit 25 and executes the applet production program. When executed by the processing unit 26, the applet production program causes the production terminal instrument 20 as a computer to execute the product code transmission processing, the information acquisition processing (the service block information acquisition processing, the trigger block information acquisition processing, the action block information acquisition processing), the service block selection processing, the trigger block selection processing, the action block selection processing, the production processing, and the like. The applet production program causes execution of each processing, for example, in a dialogue format. The processing unit 26 of the production terminal instrument 20 may execute each processing by accessing the applet production program stored in the production program storage unit 11a of the applet server 11 through a browser and executing the applet production program on the applet server 11 as described above.

Figure 3:
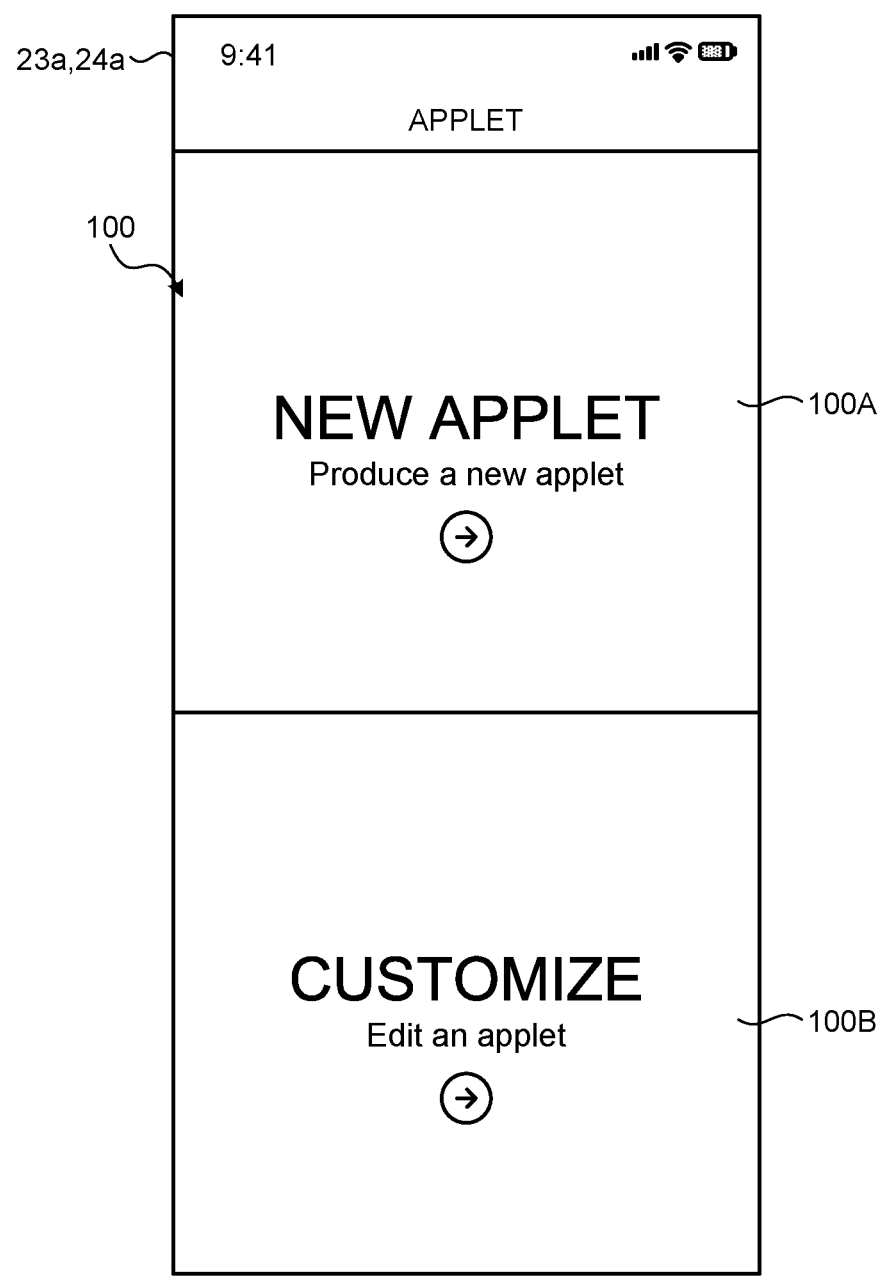
FIG. 3 is a diagram illustrating an exemplary display screen in the application program production by the computer program production system according to the embodiment.

When executing the applet production program, the processing unit 26 of the production terminal instrument 20 causes the display 24a to display a production-editing selection screen 100 as exemplarily illustrated in FIG. 3. The production-editing selection screen 100 illustrated in FIG. 3 includes a new-production selection region 100A and an editing selection region 100B. In the production-editing selection screen 100, the new-production selection region 100A is positioned on the upper side, and the editing selection region 100B is positioned on the lower side. The new-production selection region 100A is a region that is selected when a new applet is to be produced and in which character images of "NEW APPLET", "Produce a new applet", and the like are displayed. The editing selection region 100B is a region that is selected when an existing applet is to be edited and in which character images of "CUSTOMIZE", "Edit an applet", and the like are displayed. When the new-production selection region 100A is selected in accordance with, for example, a tap operation on the touch panel 23a by the producer, the processing unit 26 causes the display 24a to display an applet production screen 101 as exemplarily illustrated in FIG. 4 (step S3). The above-described processing at steps S1 to S3 are included in an applet production screen display process.

The following describes a case in which the new-production selection region 100A is selected to produce a new applet. Part of processing executed to produce a new applet is performed also in a case in which the editing selection region 100B is selected to edit an existing applet, and thus detailed description of the case will be omitted in the following.

Figure 4:
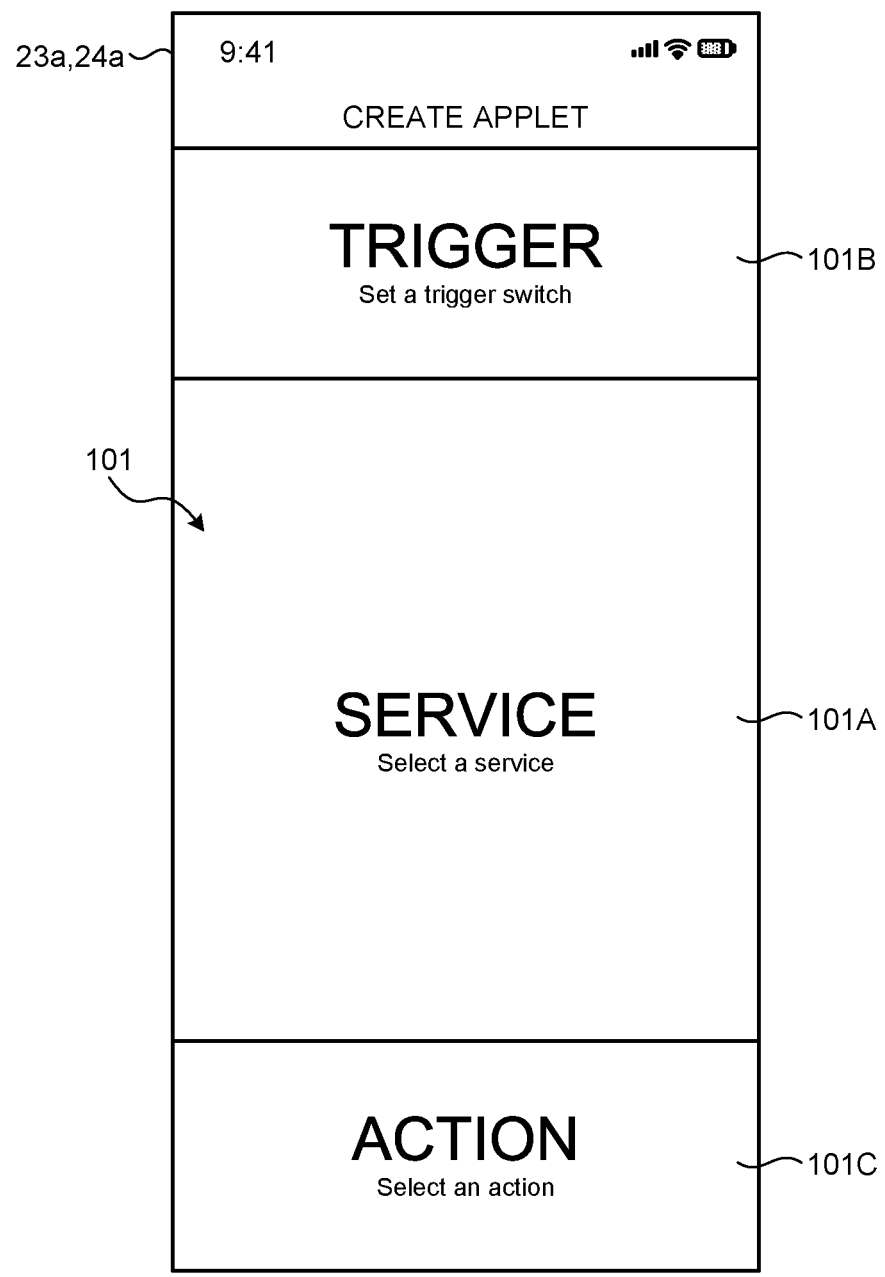
FIG. 4 is a diagram illustrating an exemplary display screen in the application program production by the computer program production system according to the embodiment.

The applet production screen 101 illustrated in FIG. 4 includes a service selection region 101A, a trigger selection region 101B, and an action selection region 101C. In the applet production screen 101, the trigger selection region 101B is positioned on the upper side, the service selection region 101A is positioned at the center, and the action selection region 101C is positioned on the lower side. The service selection region 101A is a region that is selected to select a service block to be included in an applet and in which character images of "SERVICE", "Select a service", and the like are displayed. The trigger selection region 101B is a region that is selected to select a trigger block to be included in the applet and in which character images of "TRIGGER", "Set a trigger switch", and the like are displayed. The action selection region 101C is a region that is selected to select an action block to be included in the applet and in which character images of "ACTION", "Set an action", and the like are displayed. Then, the processing unit 26 proceeds to a service specification process when the service selection region 101A is selected in accordance with, for example, a tap operation on the touch panel 23a by the producer. Typically, in applet production, the service block selection, the trigger block selection, and the action block selection are preferably performed in the stated order. Thus, as one example, the service selection region 101A, which is recommended to be selected first, is displayed larger than the trigger selection region 101B and the action selection region 101C in an emphasized manner on the applet production screen 101 illustrated in FIG. 4.

The following describes a case in which the service selection region 101A, the trigger selection region 101B, and the action selection region 101C are selected in the stated order, but the selection is not necessarily limited to the order. The applet production program may cause the service block selection, the trigger block selection, and the action block selection to be performed in an order fixed in advance irrespective of intention of the producer. In this case, the applet production program preferably causes a service block to be selected first so that the framework of the applet is confirmed, and then causes a trigger block and an action block to be selected.

Figure 5:
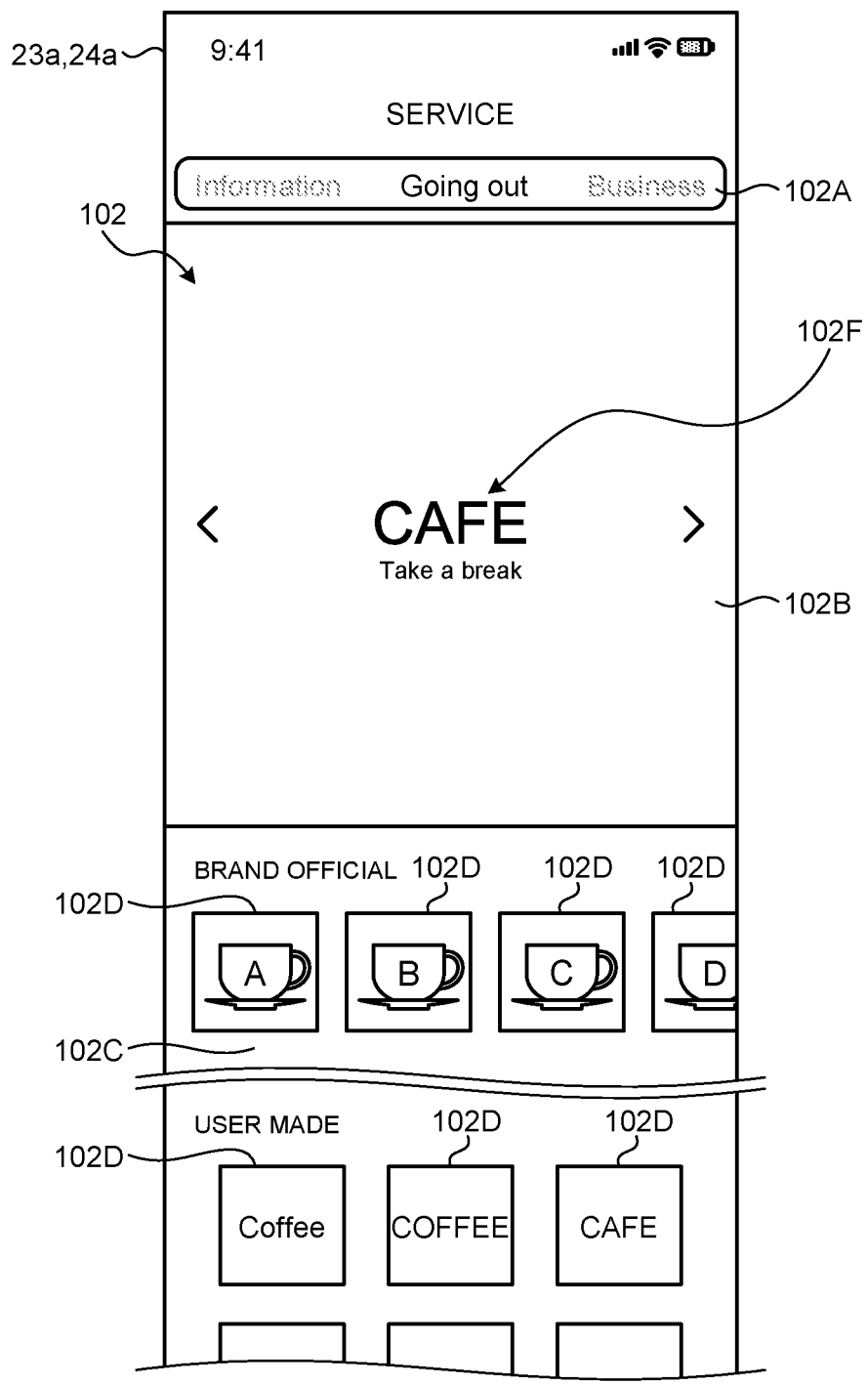
FIG. 5 is a diagram illustrating an exemplary display screen in the application program production by the computer program production system according to the embodiment.

When the service selection region 101A is selected in accordance with, for example, a tap operation on the touch panel 23a by the producer, the processing unit 26 causes the display 24a to display a service selection screen 102 as exemplarily illustrated in FIG. 5 (step S4). The service selection screen 102 illustrated in FIG. 5 includes a category selection region 102A, a tab selection region 102B, and a block selection region 102C. In the service selection screen 102, the category selection region 102A is positioned on the upper side, the tab selection region 102B is positioned at the center, and the block selection region 102C is positioned on the lower side. The category selection region 102A is a region that is operated to select a category in accordance with, for example, the contents of a service and in which a character image representing a selected category is displayed in an emphasized manner and a character image representing any non-selected category is displayed in a gray color or the like. When the category selection region 102A is operated in accordance with, for example, a swipe operation on the touch panel 23a by the producer, the processing unit 26 sequentially changes a category displayed in an emphasized manner in the category selection region 102A to, for example, "Going out", "Business", "Information", . . . , or the like. The tab selection region 102B is a region that is operated to select a tab in accordance with a category selected in the category selection region 102A and in which a character image representing a selected tab is displayed. When the tab selection region 102B is operated in accordance with, for example, a swipe operation on the touch panel 23a by the producer, the processing unit 26 sequentially changes a tab displayed in the tab selection region 102B to, for example, "CAFE", "THEATER", "TRAVEL", "RESTAURANT", . . . , or the like. The block selection region 102C is a region that is operated to select a service block to be incorporated in the applet from among selection candidate service blocks and in which a plurality of icon images 102D representing the selection candidate service blocks are displayed. The processing unit 26 displays, in the block selection region 102C, the icon images 102D of selection candidate service blocks in accordance with the category selected in the category selection region 102A and the tab selected in the tab selection region 102B. The processing unit 26 may sequentially change a tab displayed in the tab selection region 102B in accordance with, for example, tap operations on arrow images "<" and ">" in the tab selection region 102B by the producer.

The service selection screen 102 in FIG. 5 illustrates an example in which the "Going out" category is selected in the category selection region 102A and the "CAFE" tab is selected in the tab selection region 102B, character images of "Going out" and the like are displayed in an emphasized manner in the category selection region 102A, and character images of "CAFE", "Take a break", and the like are displayed in the tab selection region 102B. In addition, on the service selection screen 102 illustrated in FIG. 5, the icon images 102D of a plurality of selection candidate service blocks provided with the "Going out" category and the "CAFE" tab are displayed in the block selection region 102C, and in this example, the icon images 102D of selection candidate service blocks produced by business operators or the like are displayed side by side in the "BRAND OFFICIAL" column, and the icon images 102D of selection candidate service blocks produced by individuals other than the business operators are displayed side by side in the "USER MADE" column. The block selection region 102C switches in accordance with the category selected in the category selection region 102A and the tab selected in the tab selection region 102B. The region of the "BRAND OFFICIAL" column and the region of the "USER MADE" column in the block selection region 102C can be scrolled in one or both of the longitudinal and lateral directions.

When the category selection region 102A and the tab selection region 102B are operated on the service selection screen 102 illustrated in FIG. 5 in accordance with, for example, a swipe operation on the touch panel 23a by the producer, the processing unit 26 selects a category and a tab in accordance with, for example, the contents of a desired service (step S5). Then, the processing unit 26 transmits a block information request in accordance with the selected category and tab to the block server 12 through the communication unit 22 and the network N (step S6).

Having received the block information request in accordance with the selected category and tab from the production terminal instrument 20, the block server 12 extracts, in accordance with the block information request, selection candidate service blocks provided with the selected category and tab from among selection candidate service blocks managed by the block management unit 12a. Then, the block server 12 replies, as block information, information related to the extracted selection candidate service blocks to the production terminal instrument 20 through the network N (step S7). The replied information related to the selection candidate service blocks is not the selection candidate trigger blocks but is information such as icon images representing the selection candidate trigger blocks.

Having received the block information from the block server 12, the processing unit 26 temporarily stores the block information in the storage unit 25 and displays a block selection screen in the block selection region 102C of the service selection screen 102 illustrated in FIG. 5 (step S8). Specifically, the processing unit 26 displays side by side the icon images 102D of the selection candidate service blocks included in the block information, in other words, the icon images 102D of the selection candidate service blocks provided with the selected category and tab. The icon images 102D displayed in the block selection region 102C may be arranged in accordance with a rule based on various kinds of tendencies such as the number of times use by the user and the number of times of downloading. Then, when any of the icon images 102D in the block selection region 102C is selected in accordance with, for example, a tap operation on the touch panel 23a by the producer on the service selection screen 102 illustrated in FIG. 5, the processing unit 26 selects a service block to be actually incorporated in the applet from among the selection candidate service blocks (step S9).

Figure 6:
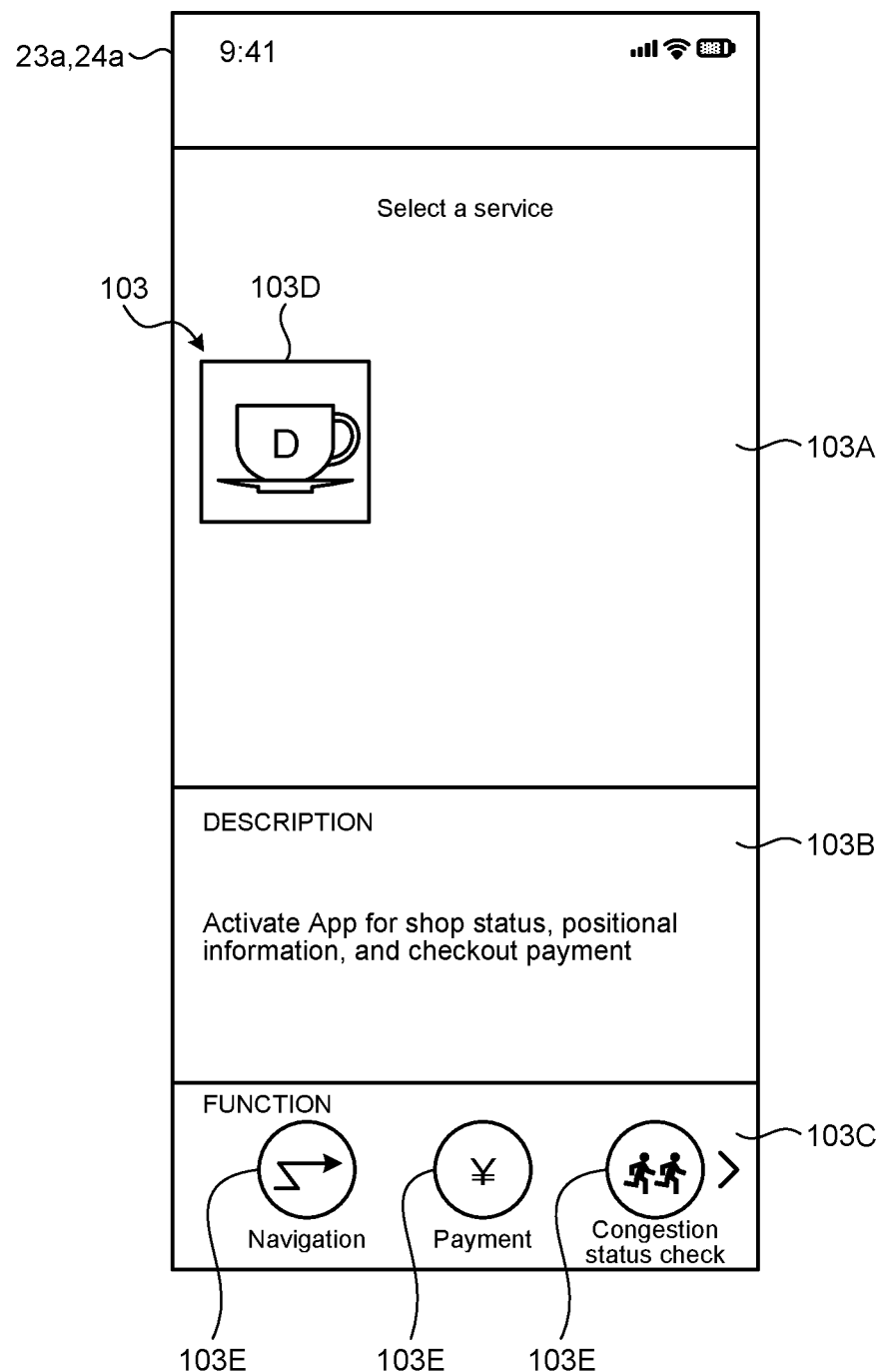
FIG. 6 is a diagram illustrating an exemplary display screen in the application program production by the computer program production system according to the embodiment.

When the service block is selected in the processing at step S9, the processing unit 26 causes the display 24a to display a service content determination screen 103 as exemplarily illustrated in FIG. 6. The service content determination screen 103 illustrated in FIG. 6 includes a determination block display region 103A, a detailed content description region 103B, and a service content selection region 103C. In the service content determination screen 103, the determination block display region 103A is positioned on the upper side, the detailed content description region 103B is positioned at the center, and the service content selection region 103C is positioned on the lower side. The determination block display region 103A is a region in which the service block selected at step S9 is displayed and an icon image 103D of the selected service block is displayed. In this case, the icon image of any service block not selected at step S9 may be additionally displayed in a gray color or the like in the determination block display region 103A. The detailed content description region 103B is a region in which, for example, the detailed contents of the service block selected at step S9 are displayed and character images providing explanation of the detailed contents of the service block, recommended settings, and the like are displayed. The service content selection region 103C is a region that is operated to select output information desired to be output in accordance with the service contents of the service block selected at step S9 and in which a plurality of icon images 103E each representing output information serving as a selection candidate are displayed. The processing unit 26 displays, in the service content selection region 103C, the icon images 103E of output information in accordance with service contents that can be performed by the service block. In the service content selection region 103C of the service content determination screen 103 illustrated in FIG. 6, for example, the icon image 103E representing "navigation information", the icon image 102D representing "payment information", and the icon image 103E representing "congestion information" are displayed as the output information in accordance with service contents.

When any icon image 103E in the service content selection region 103C is selected in accordance with, for example, a tap operation on the touch panel 23a by the producer on the service content determination screen 103 illustrated in FIG. 6, the processing unit 26 selects output information in accordance with a desired service from among selection candidate service contents (step S10). Then, the processing unit 26 stores selection results of the service block selected at step S9 and the service content selected at step S10 in the storage unit 25.

The above-described processing at steps S4 to S10 is included in a service specification process: the processing at step S7 corresponds to the service block information acquisition processing of the information acquisition processing, and the processing at step S9 corresponds to the service block selection processing.

Figure 7:
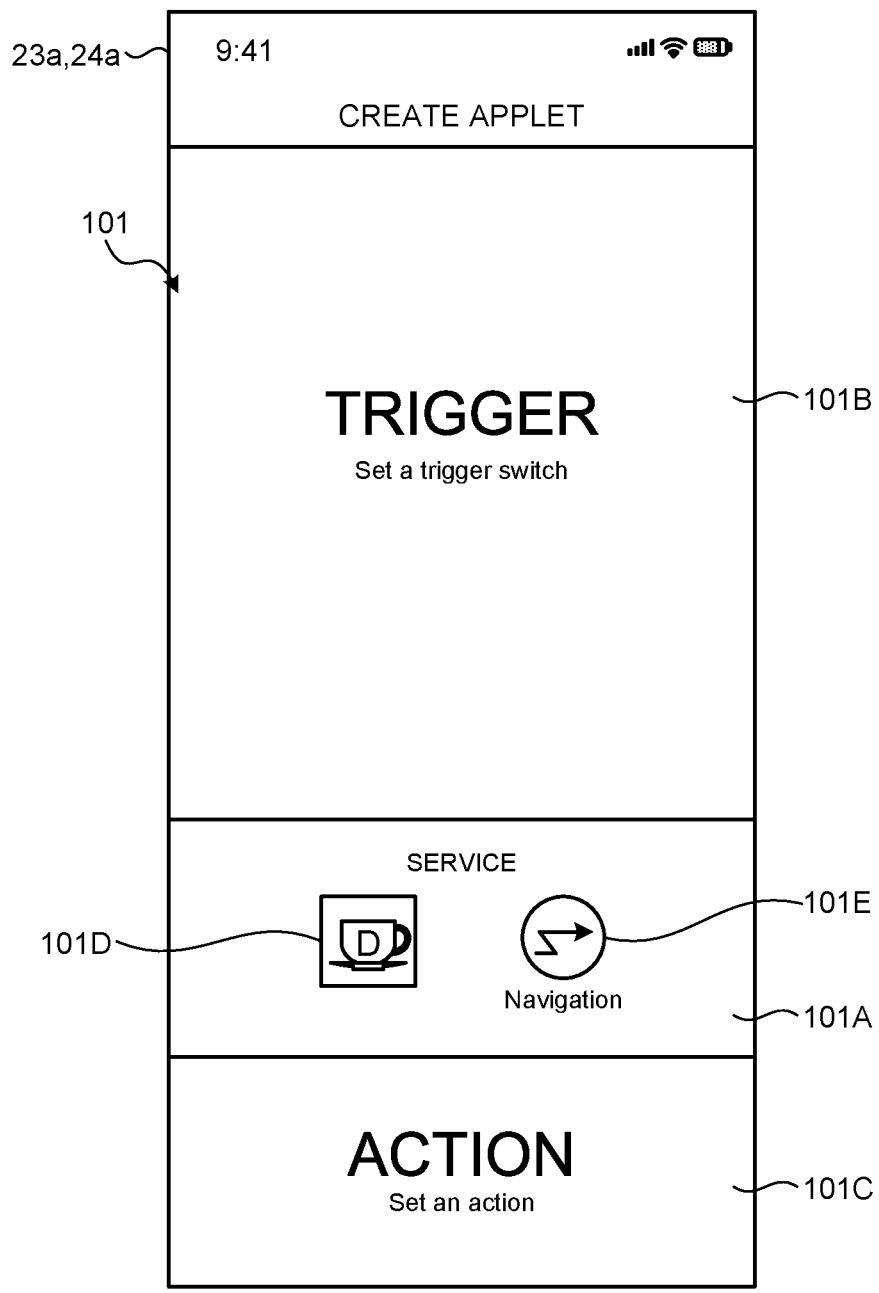
FIG. 7 is a diagram illustrating an exemplary display screen in the application program production by the computer program production system according to the embodiment.

When the service content of the service block is selected by the processing at step S10, the processing unit 26 causes the display 24a to display the applet production screen 101 as exemplarily illustrated in FIG. 7 again. In this case, the processing unit 26 displays, in the service selection region 101A of the applet production screen 101 illustrated in FIG. 7, an icon image 101D of the service block selected at step S9 and an icon image 101E of the output information in accordance with the service content selected at step S10. Then, when the trigger selection region 101B is selected in accordance with, for example, a tap operation on the touch panel 23a by the producer, the processing unit 26 proceeds to a trigger specification process (step S11). The applet production screen 101 in FIG. 7 illustrates an example in which the trigger selection region 101B, which is recommended to be selected next, is displayed larger than the service selection region 101A and the action selection region 101C in an emphasized manner.

When the trigger selection region 101B is selected by the processing at step S11, the processing unit 26 transmits a product code request to an operation target instrument D as the production target of the applet through the communication unit 22 (step S12). Having received the product code request from the production terminal instrument 20, the operation target instrument D reads a product code stored in the storage unit thereof and replies the product code to the production terminal instrument 20 (step S13). When a plurality of operation target instruments D are to be operated in cooperation by the applet, the processing unit 26 performs the processing at steps S12 and S13 for each operation target instrument D to acquire the product code of the operation target instrument D.

The processing at steps S12 and S13 may be performed at an appropriate timing while the production terminal instrument 20 and the operation target instrument D can perform short-distance communication through the communication unit 22. In the following description, the processing unit 26 transmits the product code request to the operation target instrument D and acquires a product code by receiving a reply from the operation target instrument D, but the present invention is not limited thereto, and for example, the product code may be acquired through a direct input to the input unit 23 by the producer. Alternatively, the processing unit 26 may search for a product code or specify a desired product code in a list to acquire the product code of the operation target instrument D as the production target of the applet (this is same for a product code in an action specification process to be described later).

In this example, when having received a product code from the operation target instrument D, the processing unit 26 transmits the received product code to the product server 13 through the communication unit 22 and the network N (step S14). Having received the product code from the production terminal instrument 20, the product server 13 extracts selection candidate trigger blocks that can be achieved by the operation target instrument D specified by the product code from among selection candidate trigger blocks managed by the block management unit 12a of the block server 12 (or the trigger information storage unit 13b of the product server 13). When having received a plurality of product codes from the production terminal instrument 20, the product server 13 extracts selection candidate trigger blocks that can be achieved by the operation target instrument D specified by each product code. When there are no selection candidate trigger blocks for the operation target instrument D specified by each product code received from the production terminal instrument 20, the product server 13 may estimate an operation target instrument D highly related to the product code and extract selection candidate trigger blocks related to the highly related operation target instrument D. Then, the product server 13 replies, as trigger extraction information, information related to the extracted selection candidate trigger blocks to the production terminal instrument 20 through the network N (step S15). The replied information related to each selection candidate trigger block is not the extracted selection candidate trigger block but is information such as the trigger information (the trigger generation unit candidate information and the trigger content information) of the selection candidate trigger block and an icon image representing the selection candidate trigger block.

Figure 8:
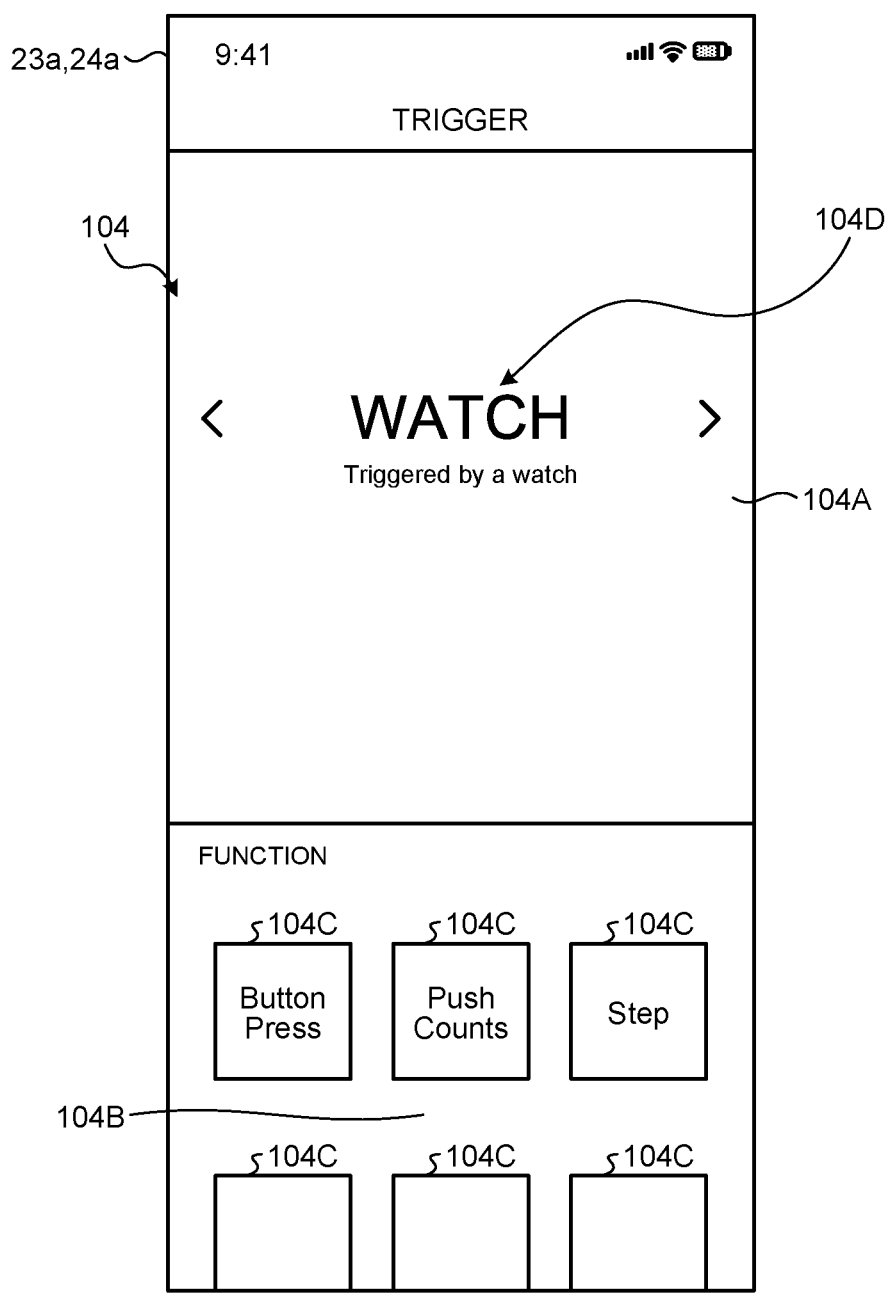
FIG. 8 is a diagram illustrating an exemplary display screen in the application program production by the computer program production system according to the embodiment.

Having received the trigger extraction information from the product server 13, the processing unit 26 temporarily stores the trigger extraction information in the storage unit 25 and causes the display 24a to display a trigger selection screen 104 as exemplarily illustrated in FIG. 8 (step S16). The trigger selection screen 104 illustrated in FIG. 8 includes a trigger generation instrument selection region 104A and a trigger selection region 104B. In the trigger selection screen 104, the trigger generation instrument selection region 104A is positioned on the upper side, and the trigger selection region 104B is positioned on the lower side. The trigger generation instrument selection region 104A is a region that is operated to select an operation target instrument D at which a trigger is to be generated, and in which a character image representing a selected operation target instrument D is displayed. When only one operation target instrument D can be selected, the processing unit 26 displays a character image representing the operation target instrument D in the trigger generation instrument selection region 104A. When a plurality of operation target instruments D can be selected (for example, when a plurality of operation target instruments D are to be operated in cooperation by the applet), the processing unit 26 sequentially changes the character image of an operation target instrument D displayed in the trigger generation instrument selection region 104A when the trigger generation instrument selection region 104A is operated in accordance with, for example, a swipe operation on the touch panel 23a by the producer. The trigger selection region 104B is a region that is operated to select a trigger block to be incorporated in the applet from among the selection candidate trigger blocks and in which a plurality of icon images 104C representing selection candidate trigger blocks that can be achieved by an operation target instrument D are displayed. The processing unit 26 displays, in the trigger selection region 104B, the icon images 104C of selection candidate trigger blocks that can be achieved by an operation target instrument D selected in the trigger generation instrument selection region 104A.

The trigger selection screen 104 in FIG. 8 illustrates an example in which a "watch" is selected as the operation target instrument D in the trigger generation instrument selection region 104A, and character images of "WATCH", "Triggered by a watch", and the like are displayed in the trigger generation instrument selection region 104A. In addition, character images of the brand name, model name, and the like of the selected operation target instrument D may be displayed in the trigger generation instrument selection region 104A of the trigger selection screen 104. In the trigger selection region 104B of the trigger selection screen 104 illustrated in FIG. 8, the icon images 104C of selection candidate trigger blocks that can be achieved by the "watch" as the operation target instrument D are displayed, and for example, the icon image 104C representing "Button Press", the icon image 104C representing "Push Counts", and the icon image 104C representing "Steps" are displayed. The trigger selection region 104B can be vertically scrolled.

When any icon image 104C in the trigger selection region 104B is selected in accordance with, for example, a tap operation on the touch panel 23a by the producer on the trigger selection screen 104 illustrated in FIG. 8, the processing unit 26 selects a trigger block to be actually incorporated in the applet from among the selection candidate trigger blocks (step S17). Then, the processing unit 26 stores a selection result of the trigger block selected at step S17 in the storage unit 25.

Figure 9:
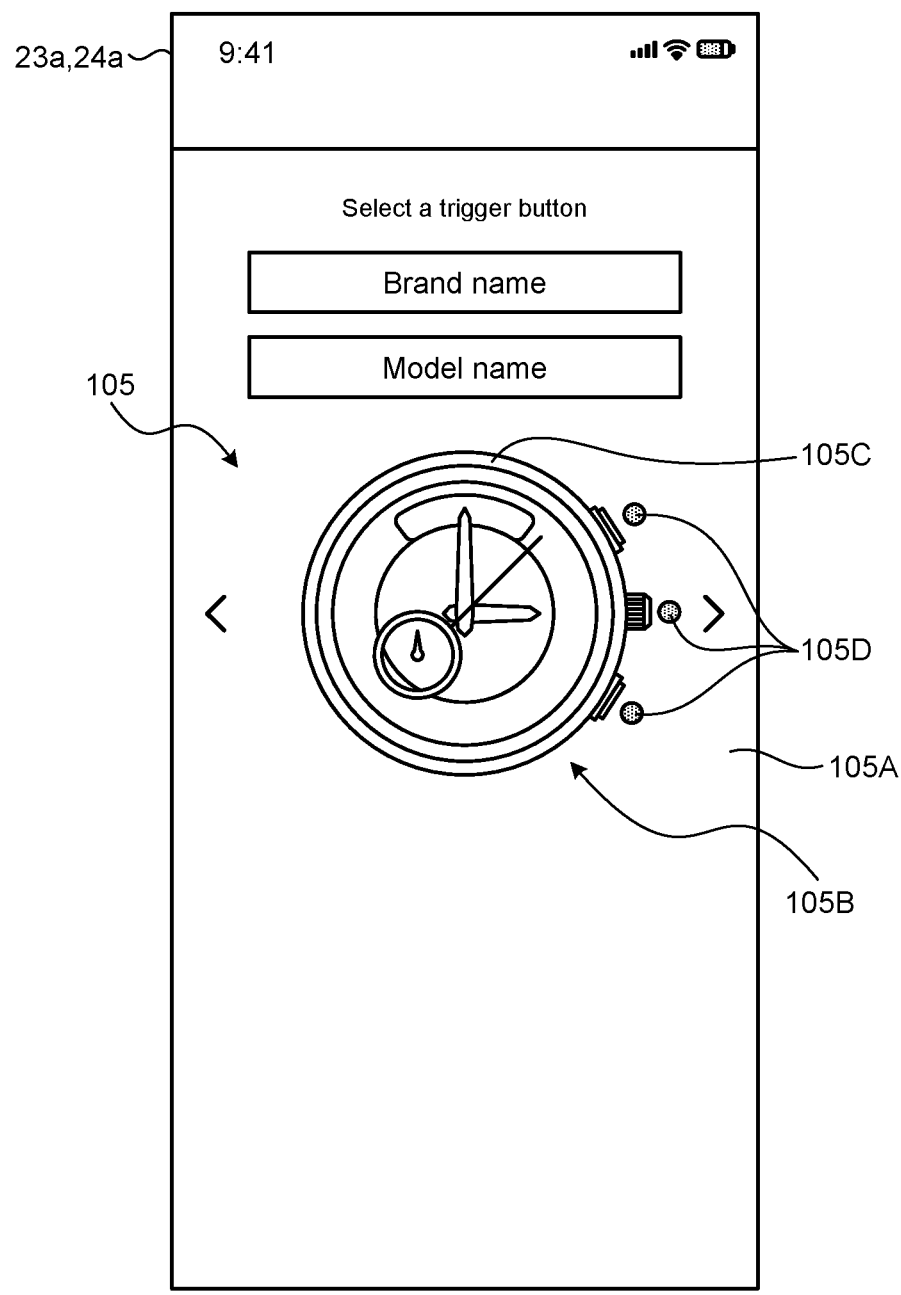
FIG. 9 is a diagram illustrating an exemplary display screen in the application program production by the computer program production system according to the embodiment.

In the processing at step S16, the processing unit 26 may use a trigger selection screen 105 illustrated in FIG. 9 in addition to or in place of the trigger selection screen 104 illustrated in FIG. 8. The trigger selection screen 105 illustrated in FIG. 9 includes a trigger selection region 105A. Similarly to the trigger selection region 104B, the trigger selection region 105A is a region that is operated to select a trigger block to be incorporated in the applet from among the selection candidate trigger blocks, but is different from the trigger selection region 104B in that a schematic image 105B is displayed in place of the icon images 104C and the like. The schematic image 105B includes an instrument image 105C representing the shape of each component of the operation target instrument D at which a trigger is to be generated as well as position images 105D representing the positions of trigger generation unit candidates in accordance with the selection candidate trigger blocks that can be achieved by the operation target instrument D. Then, when only one operation target instrument D can be selected, the processing unit 26 displays the schematic image 105B of the operation target instrument D in the trigger selection region 105A. When a plurality of operation target instruments D can be selected, the processing unit 26 sequentially changes the schematic image 105B of an operation target instrument D displayed in the trigger selection region 105A when the trigger selection region 105A is operated in accordance with, for example, a swipe operation on the touch panel 23a by the producer. In this case, in addition, character images of the brand name, model name, and the like of the selected operation target instrument D may be displayed in the trigger selection region 105A of the trigger selection screen 105. In this case, in the processing at step S17, the processing unit 26 selects a trigger block to be actually incorporated in the applet from among the selection candidate trigger blocks when any position image 105D in the trigger selection region 105A is selected in accordance with, for example, a tap operation on the touch panel 23a by the producer on the trigger selection screen 105 illustrated in FIG. 9.

The above-described processing at steps S11 to S17 is included in a trigger specification process: the processing at step S14 corresponds to the product code transmission processing, the processing at step S15 corresponds to the trigger block information acquisition processing of the information acquisition processing, and the processing at step S17 corresponds to the trigger block selection processing.

Figure 10:
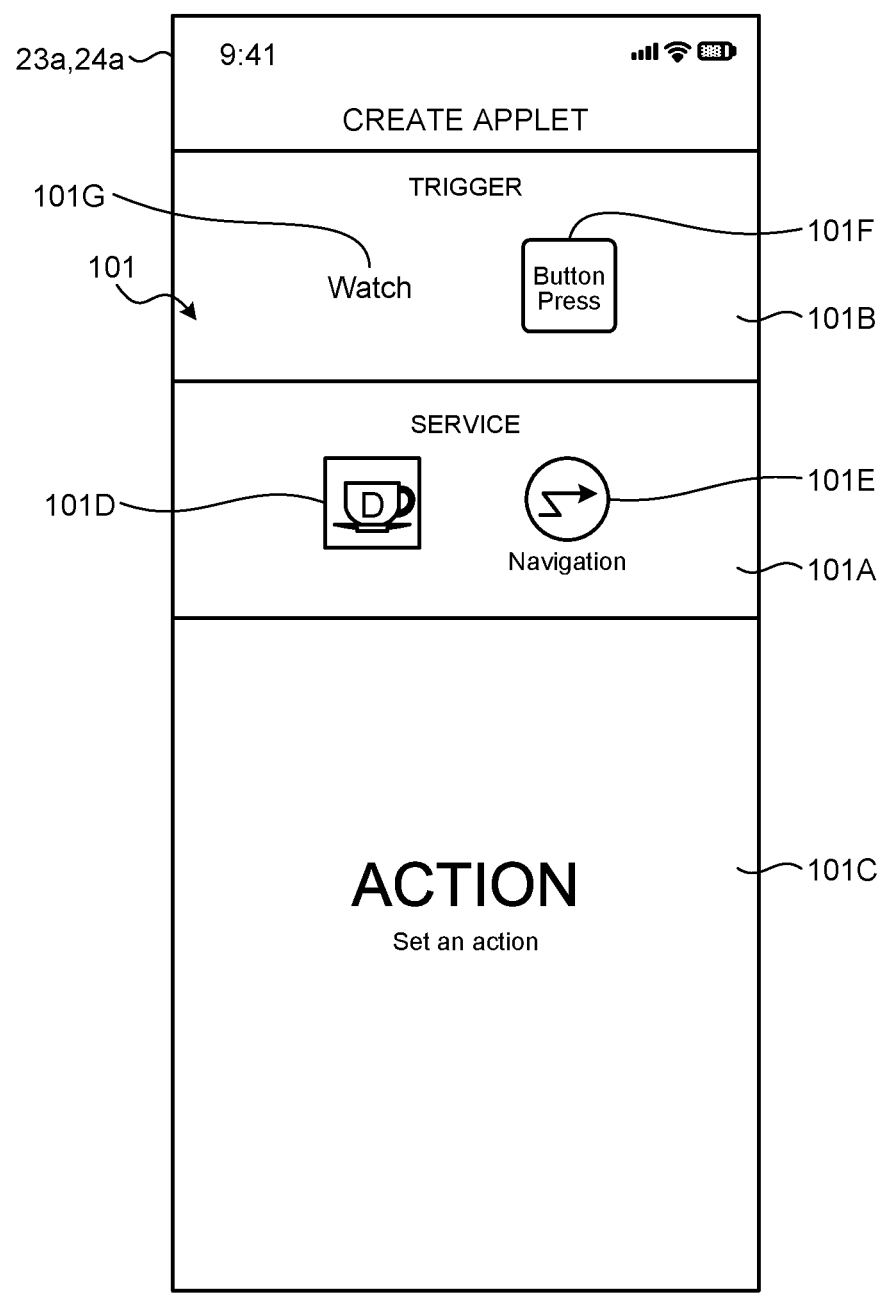
FIG. 10 is a diagram illustrating an exemplary display screen in the application program production by the computer program production system according to the embodiment.

When the trigger block to be incorporated in the applet is selected in the processing at step S17, the processing unit 26 causes the display 24a to display the applet production screen 101 as exemplarily illustrated in FIG. 10 again. In this case, the processing unit 26 displays an icon image 101F of the trigger block selected at step S17 and a character image 101G of the operation target instrument D at which the trigger is set in the trigger selection region 101B of the applet production screen 101 illustrated in FIG. 10. Then, the processing unit 26 proceeds to the action specification process when the action selection region 101C is selected in accordance with, for example, a tap operation on the touch panel 23a by the producer (step S18). The applet production screen 101 in FIG. 10 illustrates an example in which the action selection region 101C, which is recommended to be selected next, is displayed larger than the service selection region 101A and the trigger selection region 101B in an emphasized manner.

When the action selection region 101C is selected by the processing at step S18, the processing unit 26 transmits a product code request to the operation target instrument D as the production target of the applet through the communication unit 22 (step S19). Having received the product code request from the production terminal instrument 20, the operation target instrument D reads a product code stored in the storage unit thereof and replies the product code to the production terminal instrument 20 (step S20). When a plurality of operation target instruments D are to be operated in cooperation by the applet, the processing unit 26 performs the processing at steps S19 and S20 for each operation target instrument D to acquire the product codes of the operation target instruments D. The processing at steps S19 and S20 may be performed together with the above-described processing at steps S12 and S13.

Having received a product code from the operation target instrument D, the processing unit 26 transmits the received product code to the product server 13 through the communication unit 22 and the network N (step S21). Having received the product code from the production terminal instrument 20, the product server 13 extracts selection candidate action blocks that can be achieved by the operation target instrument D specified by the product code from among selection candidate action blocks managed by the block management unit 12a of the block server 12 (or the action information storage unit 13c of the product server 13). When having received a plurality of product codes from the production terminal instrument 20, the product server 13 extracts selection candidate action blocks that can be achieved by the operation target instrument D specified by each product code. When there are no selection candidate action blocks related to the operation target instrument D specified by each product code received from the production terminal instrument 20, the product server 13 may estimate an operation target instrument D highly related to the product code and may extract selection candidate action blocks related to the highly related operation target instrument D. Then, the product server 13 replies, as action extraction information, information related to the extracted selection candidate action blocks to the production terminal instrument 20 through the network N (step S22). The replied information related to each selection candidate action block is not the extracted selection candidate action block but is information such as the action information (the action execution unit candidate information and the action content information) of the selection candidate action block and an icon image representing the selection candidate action block.

Figure 11:
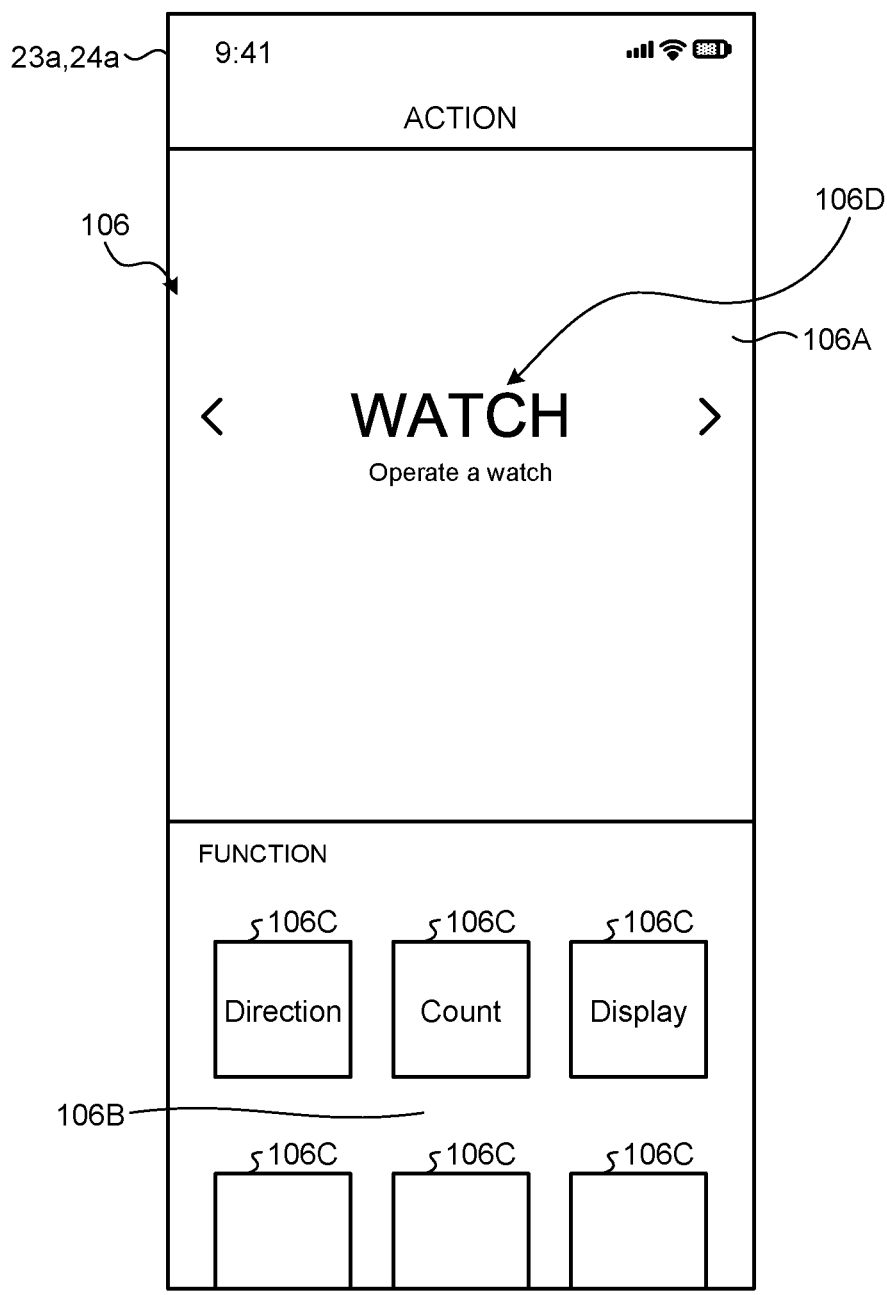
FIG. 11 is a diagram illustrating an exemplary display screen in the application program production by the computer program production system according to the embodiment.

Having received the action extraction information from the product server 13, the processing unit 26 temporarily stores the action extraction information in the storage unit 25 and causes the display 24a to display an action selection screen 106 as exemplarily illustrated in FIG. 11 (step S23). The action selection screen 106 illustrated in FIG. 11 includes an action execution instrument selection region 106A and an action selection region 106B. In the action selection screen 106, the action execution instrument selection region 106A is positioned on the upper side, and the action selection region 106B is positioned on the lower side. The action execution instrument selection region 106A is a region that is operated to select an operation target instrument D at which an action is to be executed, and in which a character image representing the selected operation target instrument D is displayed. When only one operation target instrument D can be selected, the processing unit 26 displays a character image representing the operation target instrument D in the action execution instrument selection region 106A. When a plurality of operation target instruments D can be selected (for example, when a plurality of operation target instruments D are to be operated in cooperation by the applet), the processing unit 26 sequentially changes the character image of an operation target instrument D displayed in the action execution instrument selection region 106A when the action execution instrument selection region 106A is operated in accordance with, for example, a swipe operation on the touch panel 23a by the producer. The action selection region 106B is a region that is operated to select an action block to be incorporated in the applet from among selection candidate action blocks and in which a plurality of icon images 106C representing selection candidate action blocks that can be achieved by an operation target instrument D are displayed. The processing unit 26 displays, in the action selection region 106B, the icon images 106C of selection candidate action blocks that can be achieved by an operation target instrument D selected in the action execution instrument selection region 106A.

The action selection screen 106 in FIG. 11 illustrates an example in which a "watch" is selected as the operation target instrument D in the action execution instrument selection region 106A, and character images of "WATCH", "Operate a watch", and the like are displayed in the action execution instrument selection region 106A. In addition, character images of the brand name, model name, and the like of the selected operation target instrument D may be displayed in the action execution instrument selection region 106A of the action selection screen 106. In the action selection region 106B of the action selection screen 106 illustrated in FIG. 11, the icon images 106C of selection candidate action blocks that can be achieved by the "watch" as the operation target instrument D are displayed, and for example, the icon image 106C representing "Direction", the icon image 106C representing "Count", and the icon image 106C representing "Display" are displayed. The action selection region 106B can be vertically scrolled.

The processing unit 26 selects an action block to be actually incorporated in the applet from among the selection candidate action blocks when any icon image 106C in the action selection region 106B is selected in accordance with, for example, a tap operation on the touch panel 23a by the producer on the action selection screen 106 illustrated in FIG. 11 (step S24). Then, the processing unit 26 stores a selection result of the action block selected at step S24 in the storage unit 25.

Figure 12:
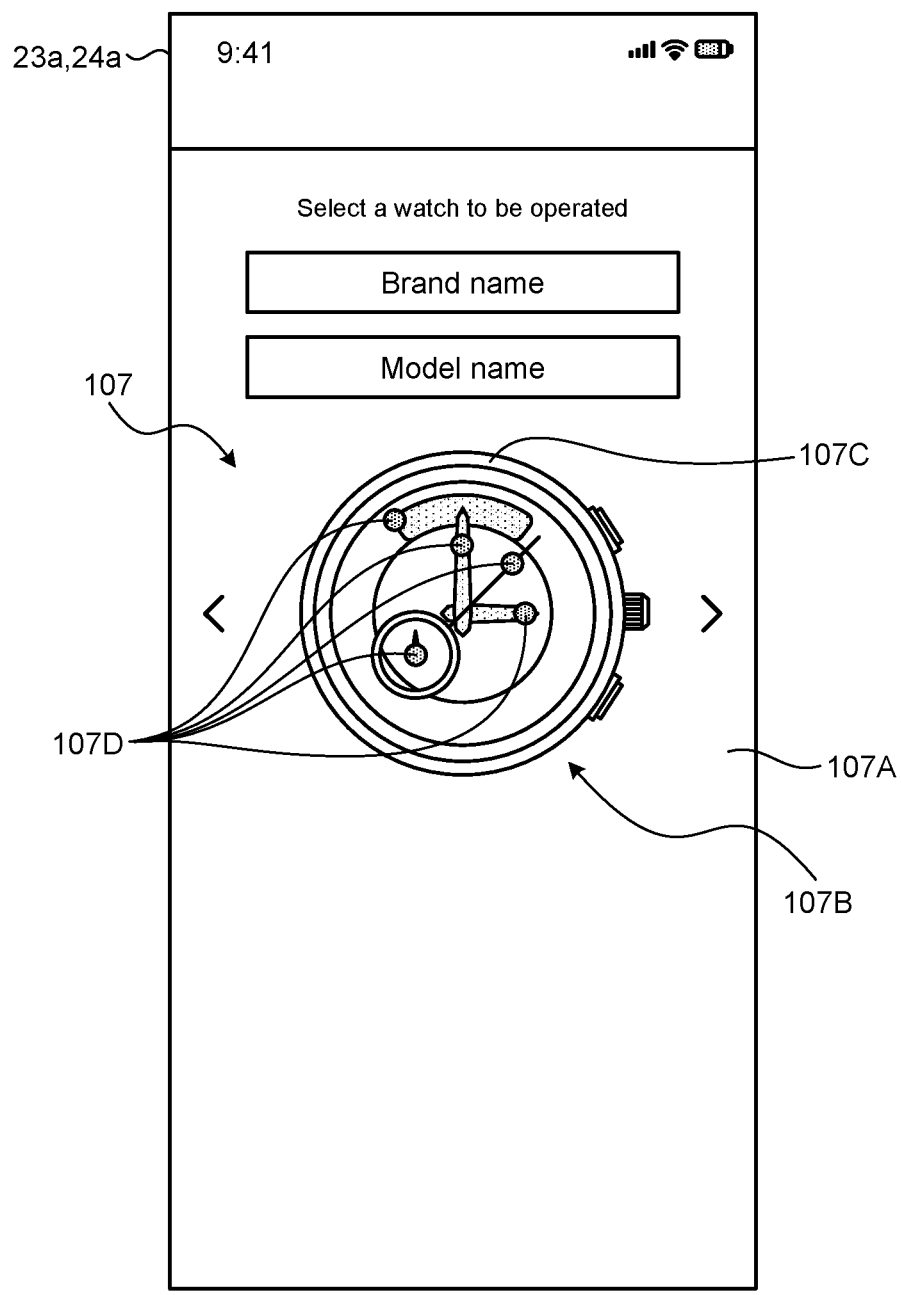
FIG. 12 is a diagram illustrating an exemplary display screen in the application program production by the computer program production system according to the embodiment.

In the processing at step S23, the processing unit 26 may use an action selection screen 107 illustrated in FIG. 12 in addition to or in place of the action selection screen 106 illustrated in FIG. 11. The action selection screen 107 illustrated in FIG. 12 includes an action selection region 107A. Similarly to the action selection region 106B, the action selection region 107A is a region that is operated to select an action block to be incorporated in the applet from among the selection candidate action blocks, but is different from the action selection region 106B in that a schematic image 107B is displayed in place of the icon images 106C and the like. The schematic image 107B includes an instrument image 107C representing the shape of each component of the operation target instrument D at which an action is to be executed as well as position images 107D representing the positions of action execution unit candidates in accordance with the selection candidate action blocks that can be achieved by the operation target instrument D. Then, when only one operation target instrument D can be selected, the processing unit 26 displays the schematic image 107B of the operation target instrument D in the action selection region 107A. When a plurality of operation target instruments D can be selected, the processing unit 26 sequentially changes the schematic image 107B of an operation target instrument D displayed in the action selection region 107A when the action selection region 107A is operated in accordance with, for example, a swipe operation on the touch panel 23a by the producer. In this case, character images of the brand name, model name, and the like of the selected operation target instrument D may be additionally displayed in the action selection region 107A of the action selection screen 107. Then, in the processing at step S24, the processing unit 26 selects an action block to be actually incorporated in the applet from among the selection candidate action blocks when any position image 107D in the action selection region 107A is selected in accordance with, for example, a tap operation on the touch panel 23a by the producer on the action selection screen 107 illustrated in FIG. 12.

The above-described processing at steps S18 to S24 is included in the action specification process: the processing at step S21 corresponds to the product code transmission processing, the processing at step S22 corresponds to the action block information acquisition processing of the information acquisition processing, and the processing at step S23 corresponds to the action block selection processing.

When the action block to be incorporated in the applet is selected by the processing at step S24, the processing unit 26 causes the display 24a to display the applet production screen 101 as exemplarily illustrated in FIG. 13 again. In this case, the processing unit 26 displays an icon image 101H of the action block selected at step S24 and a character image 101I of the operation target instrument D at which an action is set in the action selection region 101C of the applet production screen 101 illustrated in FIG. 13. Then, the processing unit 26 additionally displays a production start operation region 101J on the lower side of the action selection region 101C of the applet production screen 101 illustrated in FIG. 13. The production start operation region 101J is a region that is operated to start production of the applet with selected blocks and in which, for example, character images of "All parts are prepared", "Produce", and the like are displayed. The processing unit 26 proceeds to an applet production process when the production start operation region 101J is selected in accordance with, for example, a tap operation on the touch panel 23a by the producer (step S25).

Figure 13:
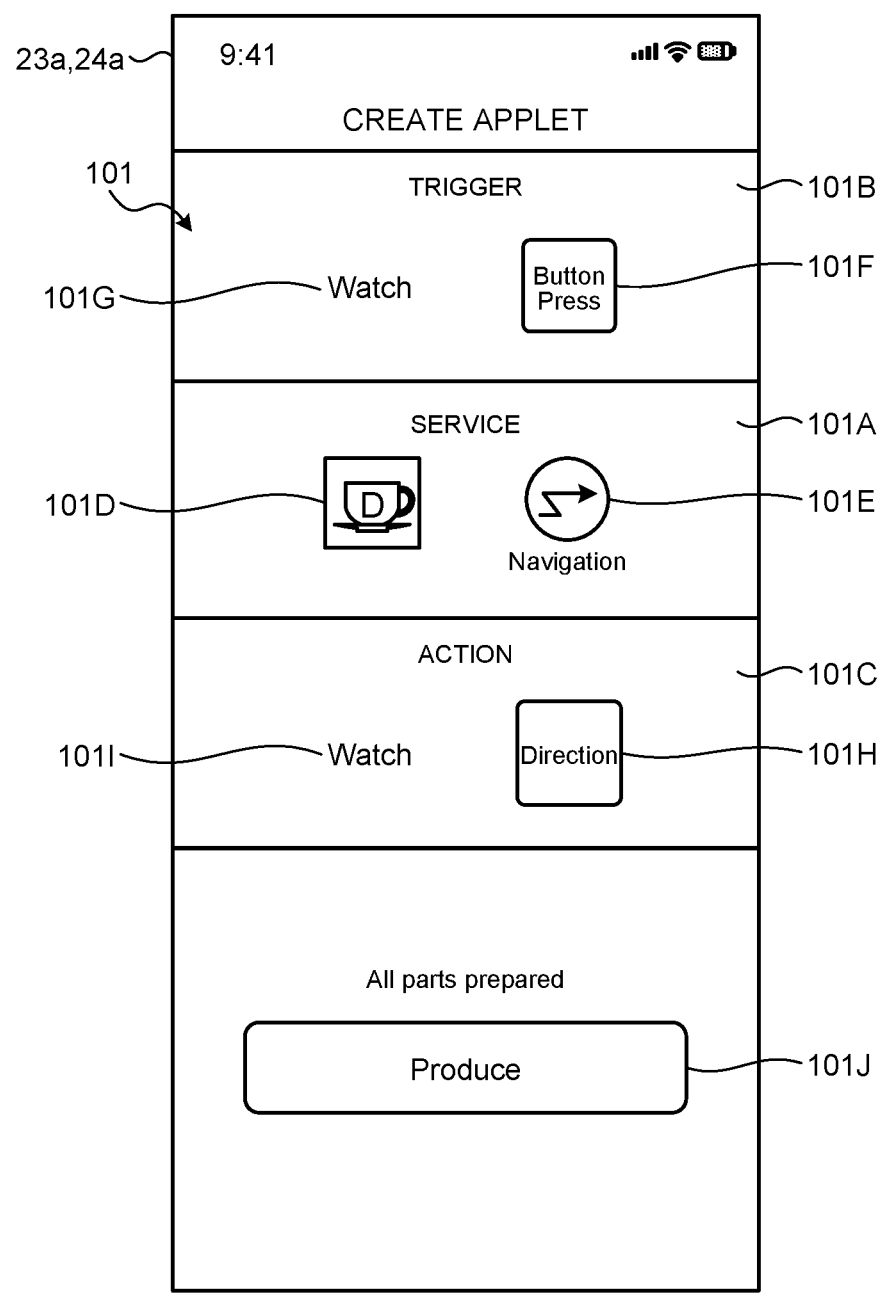
FIG. 13 is a diagram illustrating an exemplary display screen in the application program production by the computer program production system according to the embodiment.

When any of the service selection region 101A, the trigger selection region 101B, and the action selection region 101C is selected on the applet production screen 101 illustrated in FIG. 13, the processing unit 26 may proceed to any of the service specification process, the trigger specification process, and the action specification process again. When producing an applet including a plurality of service blocks, a plurality of trigger blocks, and a plurality of action blocks, the processing unit 26 may select the service blocks, the trigger blocks, and the action blocks by repeating the service specification process, the trigger specification process, and the action specification process a plurality of times in accordance with their numbers.

When the production start operation region 101J is selected by the processing at step S25, the processing unit 26 transmits an applet production request to the block server 12 through the communication unit 22 and the network N using selection results of the service block selected at step S9, the service content selected at step S10, the trigger block selected at step S17, the action block selected at step S24, and the like (step S26). In this case, the processing unit 26 may input a name, a category, a tab, a description, and the like provided to the applet to be produced in accordance with, for example, a tap operation on the touch panel 23a by the producer and may transmit these pieces of information together with the applet production request to the block server 12.

Having received the applet production request from the production terminal instrument 20, the block server 12 reads the above-described selected blocks from among selection candidate blocks managed by the block management unit 12a (or the trigger information storage unit 13b and the action information storage unit 13c of the product server 13) and combines the blocks to produce the applet. Then, the block server 12 transmits the produced applet to the applet server 11 and stores the applet in the applet storage unit 11b (step S27). In this case, when having received pieces of information such as the name, category, tab, description, and the like of the applet together with the applet production request from the production terminal instrument 20, the block server 12 may provide the name, the category, the tab, the description, and the like to the produced applet and may store the applet in the applet storage unit lib. The above-described processing at steps S25 to S27 is included in the applet production process, and the processing at step S26 corresponds to the production processing.

<Effects of Embodiment>

In the computer program production system S1 described above, the processing unit 26 of the production terminal instrument 20 can execute the information acquisition processing (steps S7, S15, and S22), the service block selection processing (step S9), the trigger block selection processing (step S17), the action block selection processing (step S24), and the production processing (step S26). The applet production program described above causes the production terminal instrument 20 as a computer to execute the information acquisition processing (steps S7, S15, and S22), the service block selection processing (step S9), the trigger block selection processing (step S17), the action block selection processing (step S24), and the production processing (step S26). Accordingly, the computer program production system S1, the applet production program, and the production terminal instrument 20 can produce an applet including a service block, a trigger block, and an action block by freely selecting and combining the service block, the trigger block, and the action block disassembled in the units of block. As a result, the computer program production system S1, the applet production program, and the production terminal instrument 20 can easily produce an applet that operates an operation target instrument D.

The computer program production system S1, the applet production program, and the production terminal instrument 20 described above can easily produce, for example, an applet that causes a plurality of operation target instruments D to cooperate with each other to perform generation of the trigger by the trigger generation unit, acquisition of the output information, and execution of the action by the action execution unit. Similarly, the computer program production system S1, the applet production program, and the production terminal instrument 20 described above can easily produce, for example, an applet that causes the production terminal instrument 20 to also operate as an operation target instrument D.

The computer program production system S1, the applet production program, and the production terminal instrument 20 described above preferably execute the trigger block selection processing (step S17) and the action block selection processing (step S24) after the service block selection processing (step S9). Accordingly, the computer program production system S1, the applet production program, and the production terminal instrument 20 can cause a service block to be selected first so that the framework of an applet is confirmed and then cause a trigger block and an action block to be selected, thereby facilitating selection of a desired trigger block and a desired action block by the producer.

The computer program production system S1, the applet production program, and the production terminal instrument 20 described above acquire information related to selection candidate trigger blocks and selection candidate action blocks selected and extracted in accordance with an operation target instrument D as the production target of an applet in the trigger block information acquisition processing (step S15) and the action block information acquisition processing (step S22). As a result, the computer program production system S1, the applet production program, and the production terminal instrument 20 can facilitate selection of a desired trigger block and a desired action block by the producer in the trigger block selection processing (step S17) and the action block selection processing (step S24).

The computer program production system S1, the applet production program, and the production terminal instrument 20 described above select and extract selection candidate trigger blocks and selection candidate action blocks in accordance with a product code transmitted to the external instrument 10 in the product code transmission processing (steps S14 and S21), and execute the trigger block selection processing (step S17) and the action block selection processing (step S24) using the extracted selection candidate trigger blocks and selection candidate action block. As a result, the computer program production system S1, the applet production program, and the production terminal instrument 20 can facilitate selection of a trigger block and an action block that can be achieved by an operation target instrument D as the production target of an applet in the trigger block selection processing (step S17) and the action block selection processing (step S24). In this example, the computer program production system S1, the applet production program, and the production terminal instrument 20 can automatically acquire the product code of the operation target instrument D through short-distance communication with the operation target instrument D and can select and extract selection candidate trigger blocks and selection candidate action blocks, thereby further facilitating applet production.

In the computer program production system S1, the applet production program, and the production terminal instrument 20 described above, since an operation target instrument D as the production target of an applet is the electronic watch D1, the glass wearable instrument D2, the smartphone D3, or the like, it is possible to easily produce an applet that can provide various kinds of services to the user through the electronic watch D1, the wearable instrument D2, the smartphone D3, or the like.

The computer program production system, the computer program, and the production terminal instrument according to the embodiment of the present invention described above are not limited to the above-described embodiment but may be modified in various manners within the scope of the claims.

The processing unit 26 described above may acquire, as production information, a block selected by each selection processing from the external instrument 10, produce an applet on the production terminal instrument 20 using the acquired block, and store the applet in the storage unit 25.

The processing unit 26 described above may allow a service block, a trigger block, and an action block that are incorporated in an applet to be selected from among all selection candidate blocks on the basis of an intention of the producer irrespective of, for example, the product code of an operation target instrument D in the selection processing for each block.

In the above description, the external instrument 10 includes a plurality of instruments (the applet server 11, the block server 12, and the product server 13), but is not limited thereto. The form of distribution of the functions of the external instrument 10 is not limited to that described above but the functions may be functionally and physically distributed and integrated in arbitrary units as long as the same effects and functions can be obtained. Computer programs, various kinds of data, and the like described above may be updated as appropriate or may be stored in another server connected with the external instrument 10 through an optional network N. The computer programs, various kinds of data, and the like described above may be recorded in a computer-readable recording medium such as a hard disk, a flexible disk (FD), a CD-ROM, an MO, or a DVD and may be read from the recording medium and executed by a computer. For example, all or some processing functions of the processing unit 26 and the external instrument 10 may be achieved by a CPU or the like, or a computer program interpreted and executed by the CPU or the like or may be achieved as hardware such as a wired logic.

<First Modification: Block Search Function>

Figure 14:
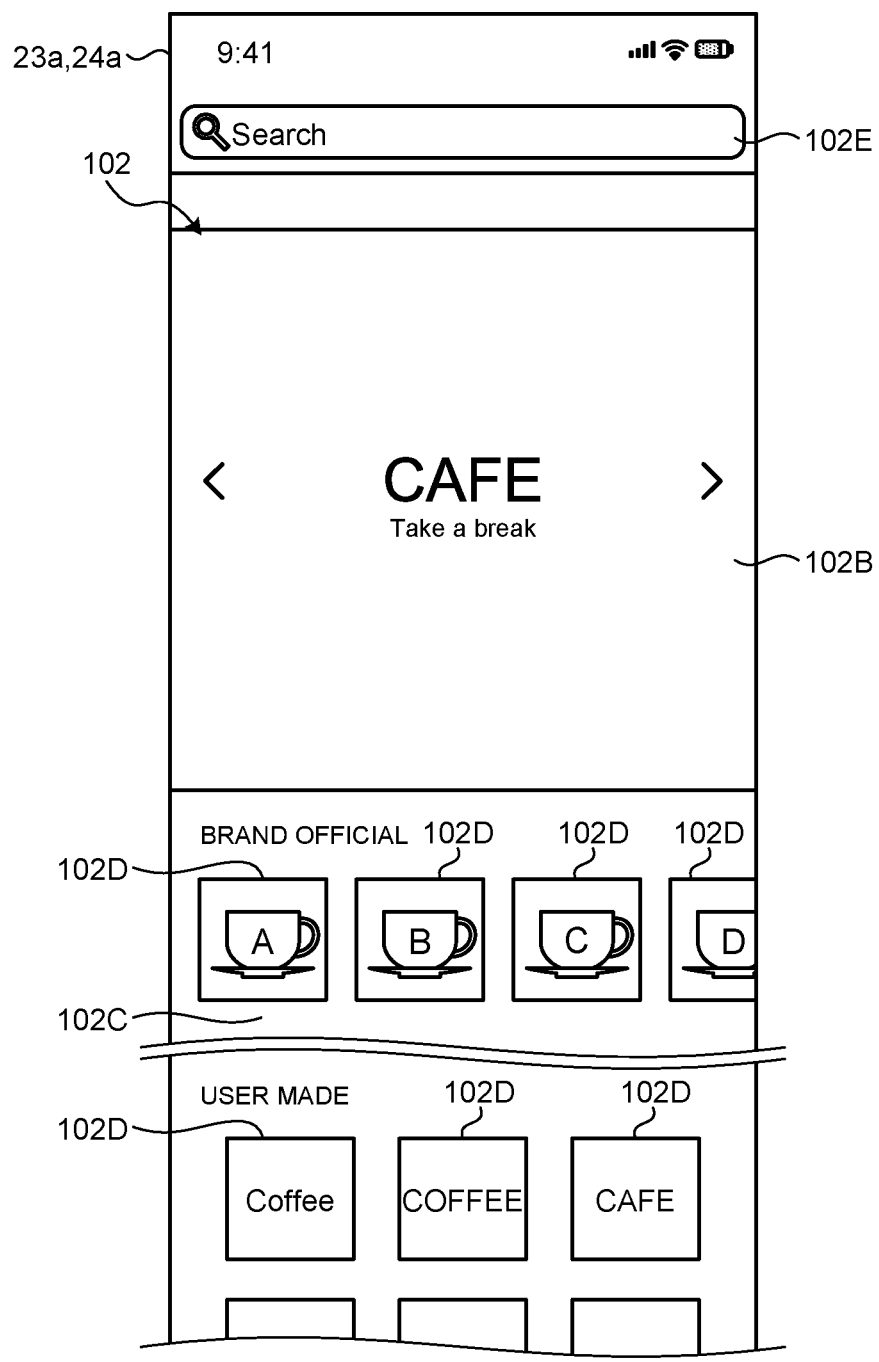
FIG. 14 is a diagram illustrating an exemplary display screen in application program production by the computer program production system according to a modification.

The processing unit 26 may provide a search window region for searching for blocks in the service selection screen 102 illustrated in FIG. 5, the trigger selection screen 104 illustrated in FIG. 8, the action selection screen 106 illustrated in FIG. 11, and the like. FIG. 14 illustrates an example in which a search window region 102E is provided to the service selection screen 102. The service selection screen 102 illustrated in FIG. 14 includes the search window region 102E in place of the category selection region 102A illustrated in FIG. 5. For example, in the above-described processing at step S4, the processing unit 26 causes the display 24a to display the service selection screen 102 as exemplarily illustrated in FIG. 14. The display 24a is included in a display unit controlled by the processing unit 26, the a display unit being capable of displaying an image. In the service selection screen 102 illustrated in FIG. 14, the search window region 102E is positioned on the upper side, the tab selection region 102B is positioned at the center, and the block selection region 102C is positioned on the lower side. The search window region 102E is a region that is operated to search for a desired block of the producer and in which character images of "Search" and the like are displayed. In this case, the processing unit 26 allows a tab to be directly selected through the tab selection region 102B without category selection and displays, in the block selection region 102C, the icon images 102D of selection candidate service blocks in accordance with a tab selected in the tab selection region 102B. Then, when the search window region 102E is selected in accordance with, for example, a tap operation on the touch panel 23a by the producer on the service selection screen 102 illustrated in FIG. 14, the processing unit 26 causes the display 24a to display a search screen 108 as exemplarily illustrated in FIG. 15.

Figure 15:
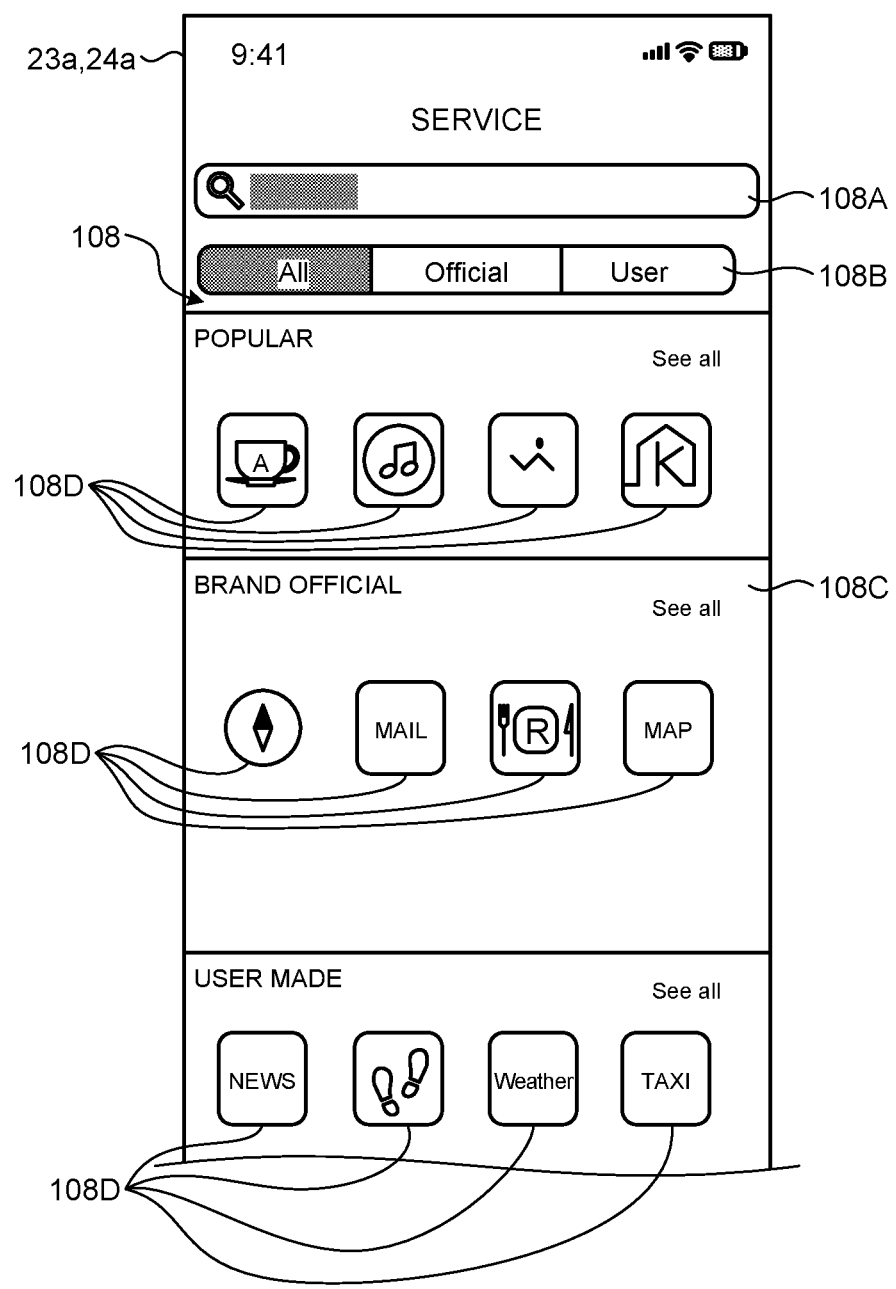
FIG. 15 is a diagram illustrating an exemplary display screen in the application program production by the computer program production system according to the modification.

The search screen 108 illustrated in FIG. 15 includes a search input region 108A, a search narrowing region 108B, and a block selection region 108C. In the search screen 108, the search input region 108A is positioned on the upper side, the search narrowing region 108B is positioned at the center, and the block selection region 108C is positioned on the lower side.

The search input region 108A is a region in which an operation to input search words is performed to search for a desired block of the producer. When the search input region 108A is operated in accordance with, for example, a tap operation on the touch panel 23a by the producer on the search screen 108 illustrated in FIG. 15, the processing unit 26 displays, for example, what is called a software keyboard in the search screen 108, and receives an operation to input search words by the producer through the touch panel 23a. Then, the processing unit 26 searches for a block using the input search words.

The search narrowing region 108B is a region that is operated to narrow search target blocks and in which a character image representing a selected search target is displayed in an emphasized manner as compared to any character image representing a non-selected search target. Character images of "All", "Official", "User", and the like are displayed as search targets in the search narrowing region 108B of the search screen 108 illustrated in FIG. 15. The search screen 108 in FIG. 15 illustrates a state in which "All" is selected as a search target and "All" is displayed in an emphasized manner as compared to "Official" and "User". When any of "All", "Official", and "User" in the search narrowing region 108B is selected in accordance with, for example, a tap operation on the touch panel 23a by the producer on the search screen 108 illustrated in FIG. 15, the processing unit 26 narrows search target blocks in accordance with the selection. When "All" is selected as a search target, the processing unit 26 does not narrow search targets but sets search targets to be all blocks. When "Official" is selected as a search target, the processing unit 26 sets search targets to be official blocks of business operators, which are produced by the business operators or the like. When "User" is selected as a search target, the processing unit 26 sets search targets to be blocks produced by individuals other than business operators.

The block selection region 108C is a region in which searched blocks (service blocks) are displayed, that is operated to select a block (service block) to be incorporated in an applet, and in which a plurality of icon images 108D representing the searched blocks (service blocks) are displayed. The processing unit 26 displays, in the block selection region 108C, the icon images 108D of blocks (service blocks) searched on the basis of the search words input to the search input region 108A and the search targets selected in the search narrowing region 108B. In the block selection region 108C of the search screen 108 illustrated in FIG. 15, the icon images 108D of relatively popular blocks are displayed side by side in the "POPULAR" column, the icon images 108D of blocks produced by business operators or the like are displayed side by side in the "BRAND OFFICIAL" column, and the icon images 108D of blocks produced by individuals other than business operators are displayed side by side in the "USER MADE" column.

Then, when any icon image 108D in the block selection region 108C is selected in accordance with, for example, a tap operation on the touch panel 23a by the producer on the search screen 108 illustrated in FIG. 15, the processing unit 26 selects a service block to be actually incorporated in the applet from among selection candidate service blocks.

The computer program production system S1, the applet production program, and the production terminal instrument 20 can facilitate search for a desired block of the producer by using the added block search function as described above. As a result, the computer program production system S1, the applet production program, and the production terminal instrument 20 can more easily produce a desired applet of the producer. The processing unit 26 can apply the block search function also to trigger block selection and action block selection. The processing unit 26 may narrow search target blocks using a category and a tab exemplarily illustrated in FIG. 5 and the like.

<Second Modification: Detailed Description Display Function>

Figure 16:
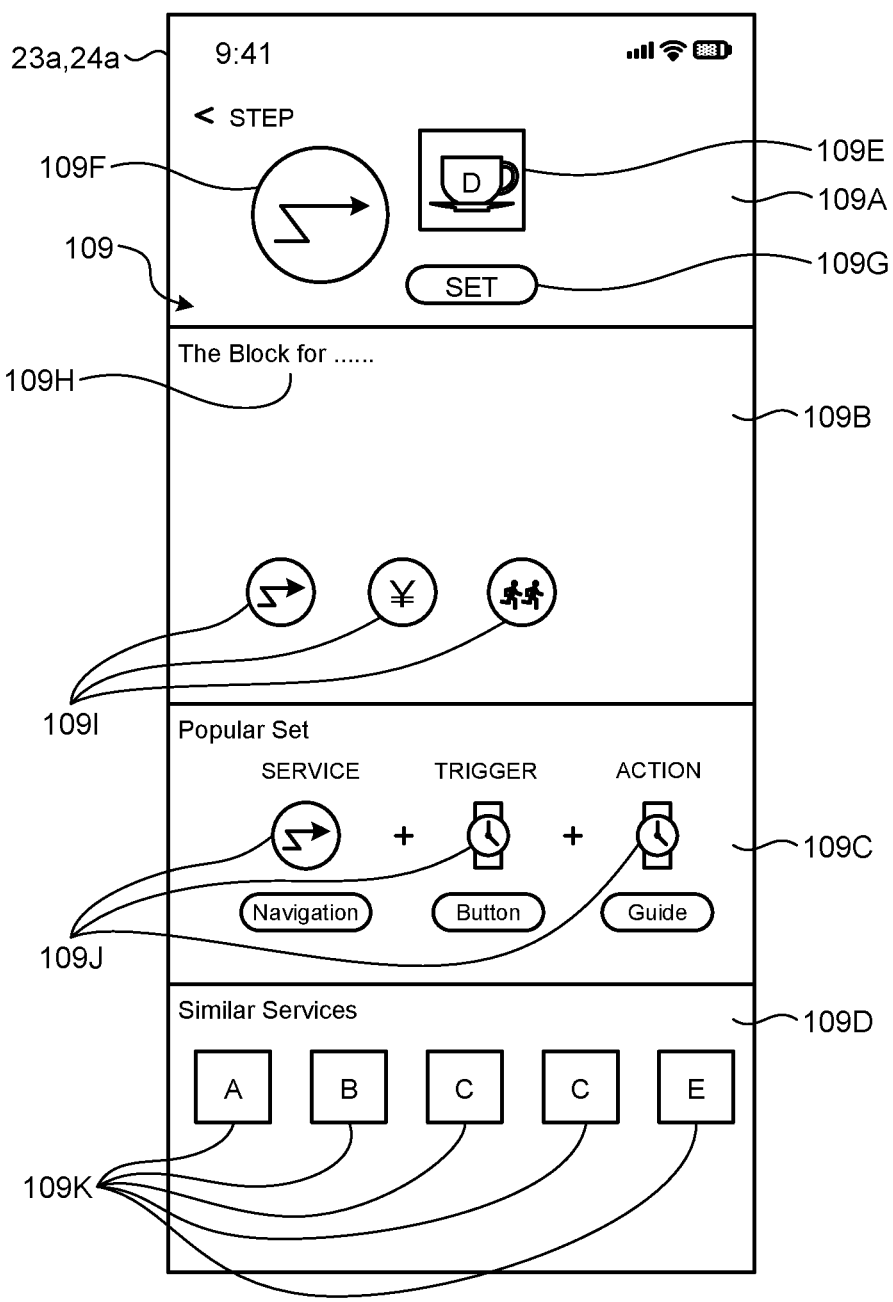
FIG. 16 is a diagram illustrating an exemplary display screen in the application program production by the computer program production system according to the modification.

The processing unit 26 may cause the display 24a to display a detailed description screen including detailed description of blocks and service contents selected in the processing at step S9, the processing at step S10, the processing at step S17, the processing at step S24, and the like described above. For example, when a desired block or service content of the producer is selected in accordance with, for example, a tap operation on the touch panel 23a by the producer in the processing at step S9, the processing at step S10, the processing at step S17, the processing at step S24, or the like, the processing unit 26 causes the display 24a to display the detailed description screen. FIG. 16 illustrates a detailed description screen 109, for example, when a desired service content of the producer is selected in the processing at step S10. The processing unit 26 causes the display 24a to display the detailed description screen 109 as exemplarily illustrated in FIG. 16 when a desired service content of the producer is selected in accordance with, for example, a tap operation on the touch panel 23a by the producer in the processing at step S10.

The detailed description screen 109 in FIG. 16 includes a target display region 109A, a detailed content description region 109B, a recommended setting display region 109C, and a similar candidate display region 109D. In the detailed description screen 109, the target display region 109A is positioned on the upper side, the detailed content description region 109B is positioned on the lower side of the target display region 109A, the recommended setting display region 109C is positioned on the lower side of the detailed content description region 109B, and the similar candidate display region 109D is positioned on the lowermost side.

The target display region 109A is a region in which a service block and a service content selected at steps S9 and S10 are displayed and an icon image 109E of the service block selected at step S9 and an icon image 109F in accordance with the service content selected at step S10 are displayed. The target display region 109A includes a confirmation operation region 109G. The confirmation operation region 109G is a region that is operated to confirm the selected service block and service content and in which, for example, character images of "SET" and the like are displayed. When the confirmation operation region 109G of the target display region 109A is selected in accordance with, for example, a tap operation on the touch panel 23a by the producer on the detailed description screen 109 in FIG. 16, the processing unit 26 confirms the selected service block and service content as a service block and a service content to be actually incorporated in an applet. Meanwhile, the processing unit 26 may return the screen of the display 24a to the service content determination screen 103 illustrated in FIG. 6 and return to the processing at step S10 in accordance with, for example, a swipe operation on the touch panel 23a by the producer on the detailed description screen 109 in FIG. 16.

The detailed content description region 109B is a region in which, for example, detailed contents of the service block and the service content selected at steps S9 and S10 are displayed and a character image 109H providing explanation of the detailed contents of the service block and the like is displayed. In this example, the detailed content description region 109B displays, together with the character image 109H, icon images 109I representing service contents that can be selected in the service block selected at step S9.

The recommended setting display region 109C is a region in which, for example, recommended settings for the service block and the service content selected at steps S9 and S10 are displayed and icon images 109J representing a combination of a trigger block and an action block recommended for the currently selected service block and service content are displayed. A recommended combination of a service block, a service content, a trigger block, and an action block is mutually associated and stored, for example, for each block stored in the block management unit 12a.

The similar candidate display region 109D is a region in which any service block similar to the service block and the service content selected at steps S9 and S10 is displayed and an icon image 109K representing the similar service block is displayed. The similar service block is mutually associated and stored, for example, for each block stored in the block management unit 12a. When any icon image 109K in the similar candidate display region 109D is selected in accordance with, for example, a tap operation on the touch panel 23a by the producer on the detailed description screen 109 in FIG. 16, the processing unit 26 can transition to, for example, the detailed description screen 109 of the service block and service content of the selected icon image 109K. Processing after the transition to the detailed description screen 109 is substantially same as that described above and thus detailed description thereof is omitted.

The computer program production system S1, the applet production program, and the production terminal instrument 20 can enrich, by using the added block detailed description display function as described above, information provided as a determination criterion to the producer when a desired block of the producer is to be selected. As a result, the computer program production system S1, the applet production program, and the production terminal instrument 20 can more easily produce a desired applet of the producer. The processing unit 26 may apply the block detailed description display function also to service block selection, trigger block selection, and action block selection.

<Third Modification: Target Model Optional Selection Function>

The processing unit 26 may allow the producer to optionally select the model of an operation target instrument D as the production target of an applet without using, for example, the product code of the operation target instrument D in place of the processing at step S12, the processing at step S13, the processing at step S19, and the processing at step S20 described above. In this case, the processing unit 26 causes the display 24a to display a model selection screen 110 as exemplarily illustrated in FIG. 17 when the new-production selection region 100A is selected in accordance with, for example, a tap operation on the touch panel 23a by the producer on, for example, the production-editing selection screen 100 illustrated in FIG. 3.

Figure 17:
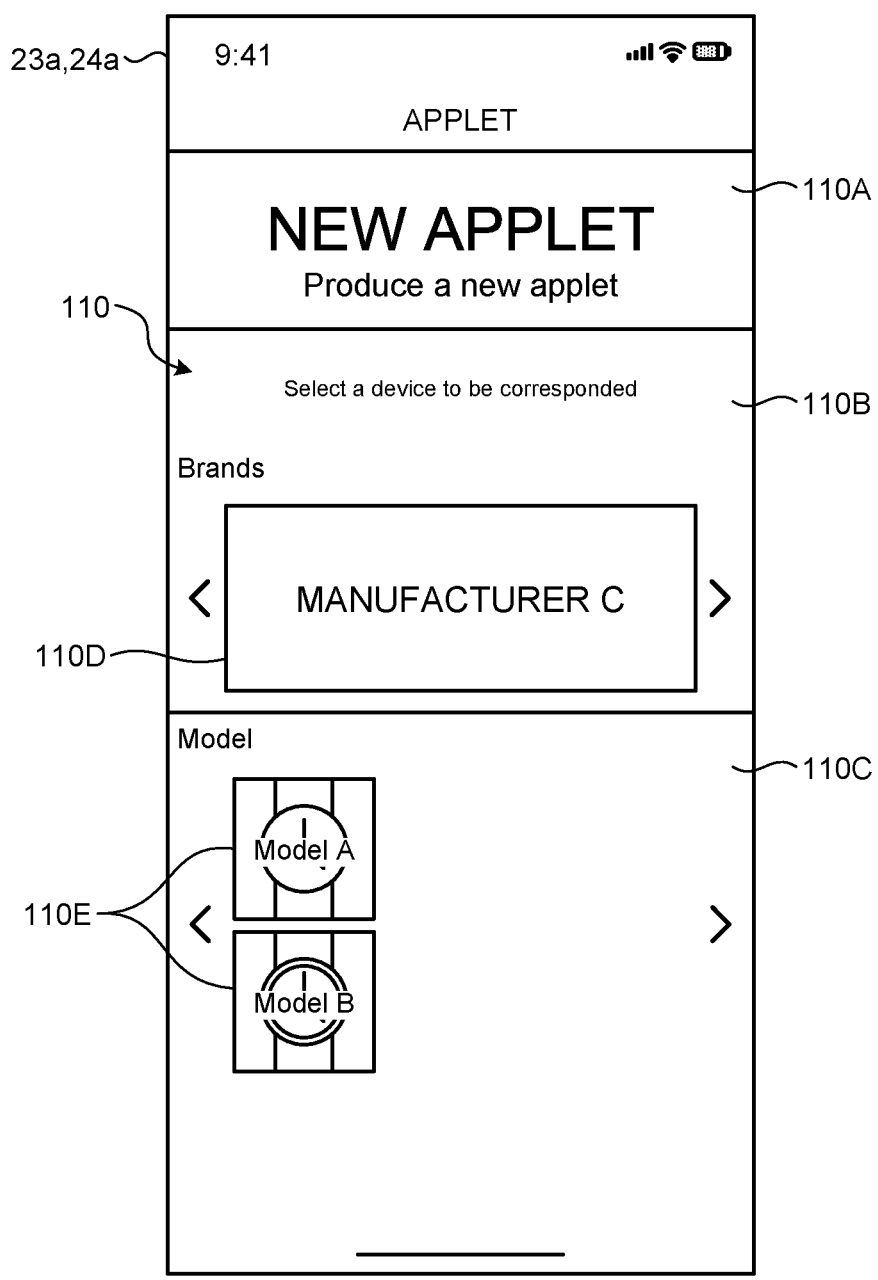
FIG. 17 is a diagram illustrating an exemplary display screen in the application program production by the computer program production system according to the modification.

The model selection screen 110 illustrated in FIG. 17 includes a production-editing display region 110A, a manufacturer selection region 110B, and a model selection region 110C. In the model selection screen 110, the production-editing display region 110A is positioned on the upper side, the manufacturer selection region 110B is positioned at the center, and the model selection region 110C is positioned on the lower side.

The production-editing display region 110A is a region that displays whether the current state is a state in which a new applet is to be produced or a state in which an existing applet is to be edited. Character images of "NEW APPLET", "Produce a new applet", and the like are displayed in the production-editing display region 110A of the model selection screen 110 illustrated in FIG. 17, which indicates that the current state is the state in which a new applet is to be produced. When the current state is the state in which a new applet is to be produced, character images of "CUSTOMIZE", "Edit an applet", and the like are displayed in the production-editing display region 110A of the model selection screen 110.

The manufacturer selection region 110B is a region that is operated to select the manufacturer of the model of an operation target instrument D as the production target of an applet and in which an icon image 110D representing a selected manufacturer is displayed together with a character image of "Brands". In this example, the icon image 110D is a character image of "Manufacturer C". When the manufacturer selection region 110B is operated in accordance with, for example, a swipe operation on the touch panel 23*a* by the producer on the model selection screen 110 illustrated in FIG. 17, the processing unit 26 sequentially changes a manufacturer to be displayed in the manufacturer selection region 110B.

The model selection region 110C is a region that is operated to select the model of an operation target instrument D as the production target of an applet and in which icon images 110E representing models in accordance with a manufacturer selected in the manufacturer selection region 110B are displayed. In this example, the icon images 110E are character images of "Model A" and "Model B". The processing unit 26 displays, in the model selection region 110C, the icon images 110E representing models in accordance with the manufacturer selected in the manufacturer selection region 110B. The model selection region 110C switches in accordance with the manufacturer selected in the manufacturer selection region 110B.

The processing unit 26 determines the model of an operation target instrument D as the production target of an applet when any icon image 110E in the model selection region 110C is selected in accordance with, for example, a tap operation on the touch panel 23*a* by the producer on the model selection screen 110 illustrated in FIG. 17. Then, the external instrument 10 performs the processing at steps S15 and S22 using the model of an operation target instrument D, which is determined by the processing unit 26. Specifically, the external instrument 10 extracts selection candidate trigger blocks and selection candidate action blocks that can be achieved by the determined model of an operation target instrument D and replies the trigger extraction information and the action extraction information to the production terminal instrument 20.

The computer program production system S1, the applet production program, and the production terminal instrument 20 can facilitate selection of a desired block by the producer with the added block target model optional selection function as described above. Accordingly, the computer program production system S1, the applet production program, and the production terminal instrument 20 can facilitate production of, for example, an applet, the production target of which is an operation target instrument D not owned by the producer. As a result, the computer program production system S1, the applet production program, and the production terminal instrument 20 can more easily produce a desired applet of the producer.

<Fourth Modification: First Variation of Applet Production Screen>

In the above description, the processing unit 26 displays the icon images 101D, 101E, 101F, and 101H and the character images 101G and 101I of blocks and service contents selected by each processing in the service selection region 101A, the trigger selection region 101B, and the action selection region 101C of the applet production screen 101 illustrated in FIG. 7, 10, or 13, but is not limited thereto. For example, the processing unit 26 may not display the icon images 101D, 101E, 101F, and 101H on the applet production screen 101 illustrated in FIG. 7, 10, or 13.

Figure 18:
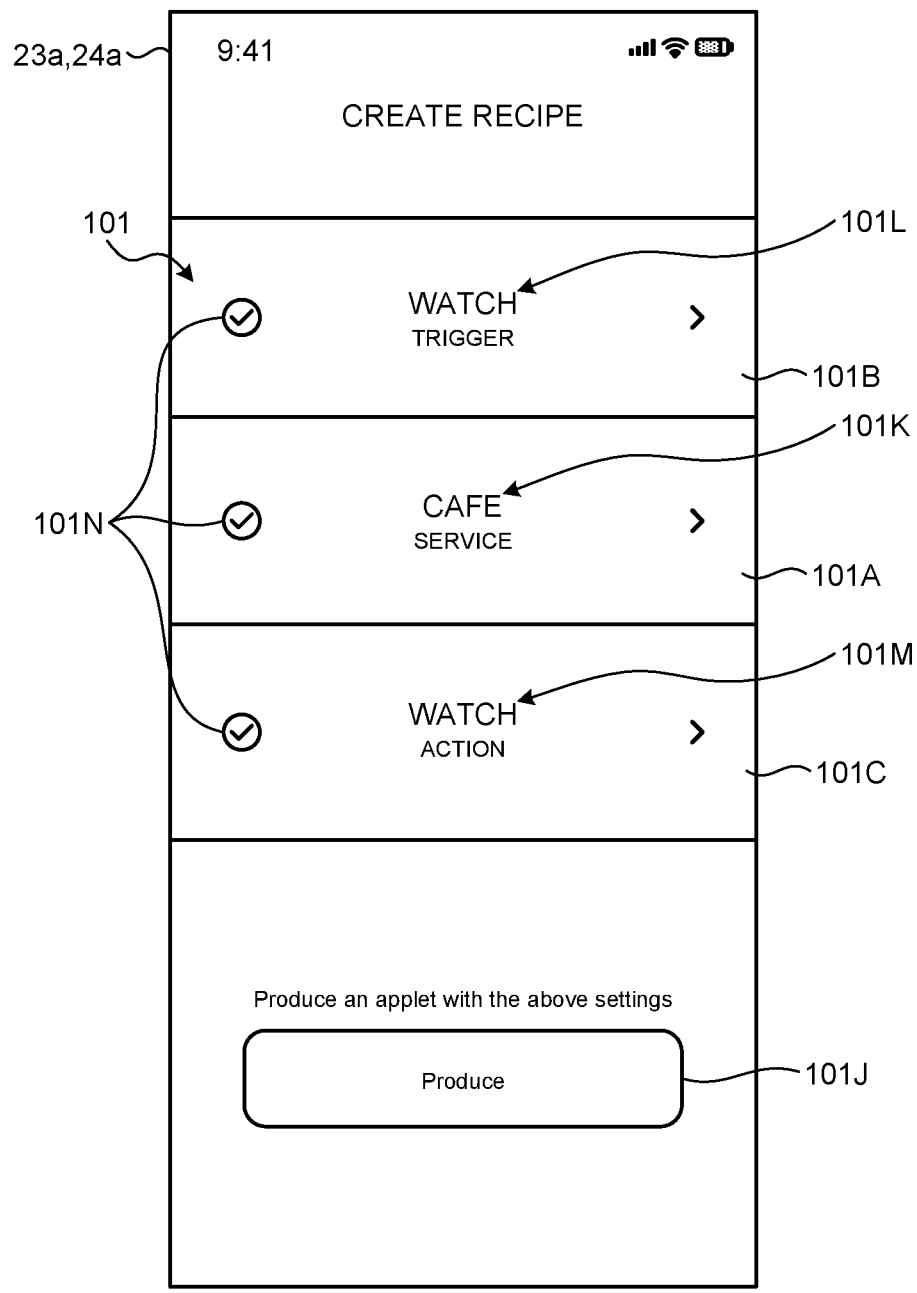
FIG. 18 is a diagram illustrating an exemplary display screen in the application program production by the computer program production system according to the modification.

FIG. 18 corresponds to, for example, the applet production screen 101 that is displayed in place of the applet production screen 101 illustrated in FIG. 13 and on which an operation to start production of an applet is performed. In this case, when an action block to be incorporated in the applet is selected in the processing at step S24, the processing unit 26 causes the display 24*a* to display the applet production screen 101 as exemplarily illustrated in FIG. 18.

Each of the tabs of "CAFE", "THEATER", "TRAVEL", "RESTAURANT", and the like displayed in the tab selection region 102B of the above-described service selection screen 102 illustrated in FIG. 5 corresponds to a service narrowing option for narrowing selection candidate service blocks. Each of character images of "CAFE", "THEATER", "TRAVEL", "RESTAURANT", and the like corresponds to a service narrowing option image 102F representing the service narrowing option. The icon images 102D correspond to icon images representing selection candidate service blocks narrowed by the service narrowing option. Thus, when selecting a service block from among the selection candidate service blocks in the above-described service block selection processing (at step S9 and the like), the processing unit 26 causes the display 24*a* to display the service narrowing option image 102F and the icon images 102D in accordance with the service narrowing option on the service selection screen 102 illustrated in FIG. 5.

Similarly, the name and the like of an operation target instrument D displayed in the trigger generation instrument selection region 104A of the above-described trigger selection screen 104 illustrated in FIG. 8 correspond to the name and the like of an operation target instrument D that can be selected as an instrument at which a trigger is to be generated, and correspond to a trigger narrowing option for narrowing selection candidate trigger blocks. Character images of "WATCH" and the like representing the name and the like of an operation target instrument D correspond to a trigger narrowing option image 104D representing the trigger narrowing option. The icon images 104C correspond to icon images representing selection candidate trigger blocks narrowed by the trigger narrowing option. Thus, when selecting a trigger block from among the selection candidate trigger blocks in the above-described trigger block selection processing (at step S17 and the like), the processing unit 26 causes the display 24*a* to display the trigger narrowing option image 104D and the icon images 104C in accordance with the trigger narrowing option on the trigger selection screen 104 illustrated in FIG. 8.

Similarly, the name and the like of an operation target instrument D displayed in the action execution instrument selection region 106A of the above-described action selection screen 106 illustrated in FIG. 11 correspond to the name and the like of an operation target instrument D that can be selected as an instrument at which an action is to be executed, and correspond to an action narrowing option for narrowing selection candidate action blocks. Character images of "WATCH" and the like representing the name and the like of an operation target instrument D correspond to an action narrowing option image 106D representing the action narrowing option. The icon images 106C correspond to icon images representing selection candidate action blocks narrowed by the action narrowing option. Thus, when selecting an action block from among the selection candidate action blocks in the above-described action block selection processing (at step S24 and the like), the processing unit 26 causes the display 24*a* to display the action narrowing option image 106D and the icon images 106C in accordance with the action narrowing option on the action selection screen 106 illustrated in FIG. 11.

The processing unit 26 causes the display 24a to display the applet production screen 101 illustrated in FIG. 18 before the production processing (at step S26 and the like) after the service block selection processing (at step S9 and the like), the trigger block selection processing (at step S17 and the like), and the action block selection processing (at step S24 and the like). In this case, the processing unit 26 causes the display 24a to display a service narrowing option image 101K, a trigger narrowing option image 101L, and an action narrowing option image 101M on the applet production screen 101 illustrated in FIG. 18 but does not display the icon images 101D, 101E, 101F, and 101H as illustrated in FIG. 13. In this example, the service narrowing option image 101K is an image (character image of "CAFE" in the example of FIG. 18) same as the service narrowing option image 102F in FIG. 5 and displayed in the service selection region 101A. The trigger narrowing option image 101L is an image (character image of "WATCH" in the example of FIG. 18) same as the trigger narrowing option image 104D in FIG. 8 and displayed in the trigger selection region 101B. The action narrowing option image 101M is an image (character image of "WATCH" in the example of FIG. 18) same as the action narrowing option image 106D in FIG. 11 and displayed in the action selection region 101C.

Similarly, on the applet production screen 101 illustrated in FIG. 7 and the applet production screen 101 illustrated in FIG. 10, as well, the processing unit 26 may cause the display 24a to display the service narrowing option image 101K and the trigger narrowing option image 101L but may not display the icon images 101D, 101E, and 101F.

The computer program production system S1, the applet production program, and the production terminal instrument 20 can provide a sense of unity to the appearance of a screen on which an operation to start production of an applet is performed by not displaying icon images representing selected blocks on the applet production screen 101 in FIG. 18 but by displaying the service narrowing option image 101K, the trigger narrowing option image 101L, and the action narrowing option image 101M in accordance with narrowing options as described above. For example, an icon image representing a block is optionally and individually designed for the block by a business operator or individual having produced the block in some cases, and in such a case, no sense of unity is potentially obtained among the designs of icon images representing selected blocks. However, the service narrowing option image 101K, the trigger narrowing option image 101L, and the action narrowing option image 101M tend to provide a design with a sense of unity than, for example, icon images representing blocks. As a result, the computer program production system S1, the applet production program, and the production terminal instrument 20 can provide a sense of unity to the appearance of a screen on which an operation to start production of an applet is performed as described above, thereby more excellently producing the applet.

In this case, the processing unit 26 may transition to a screen (for example, the detailed description screen 109 in FIG. 16) for detailed description of a selected block when any of the service selection region 101A, the trigger selection region 101B, and the action selection region 101C is selected in accordance with, for example, a tap operation on the touch panel 23a by the producer on the applet production screen 101 illustrated in FIG. 18.

Figure 19:
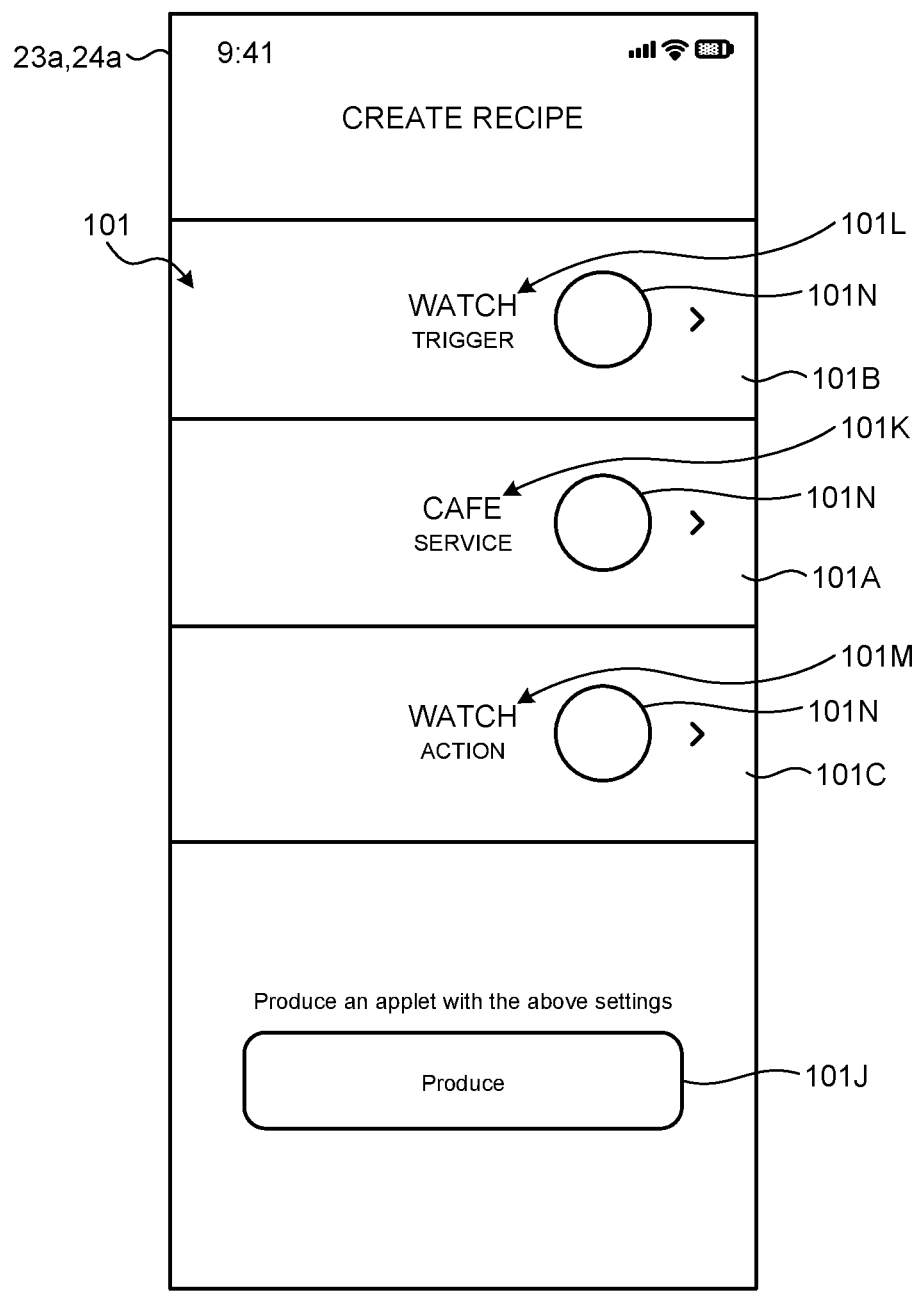
FIG. 19 is a diagram illustrating an exemplary display screen in the application program production by the computer program production system according to the modification.
Figure 20:
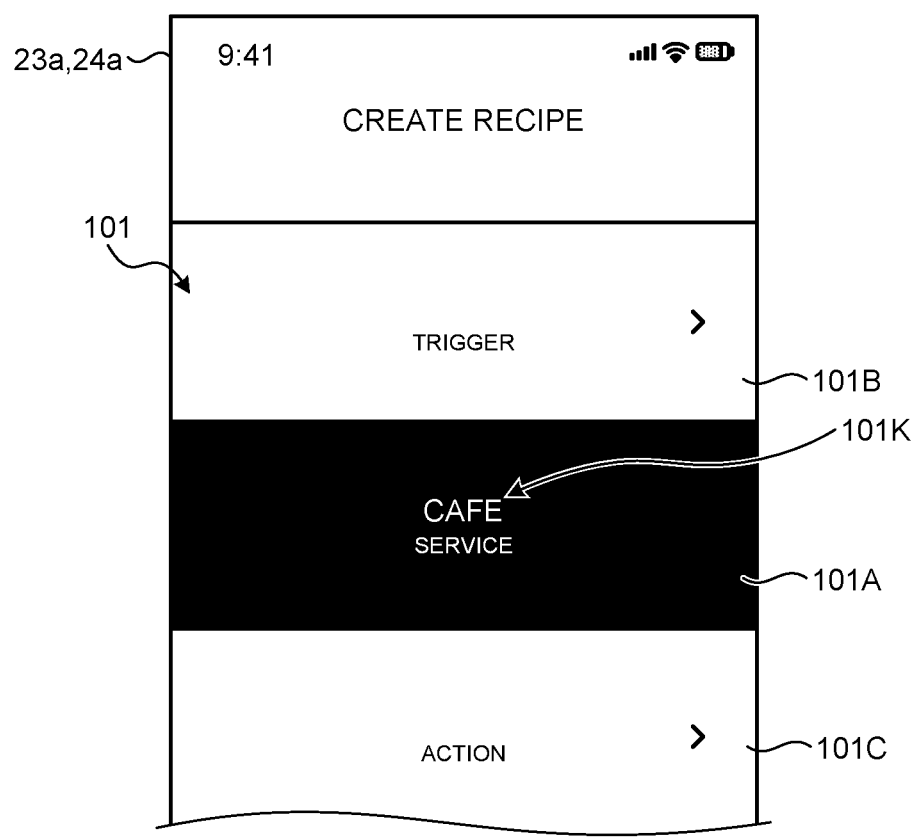
FIG. 20 is a diagram illustrating an exemplary display screen in the application program production by the computer program production system according to the modification.

On the applet production screen 101 illustrated in FIG. 18, the processing unit 26 may display a selection complete image 101N representing completion of selection in the service selection region 101A, the trigger selection region 101B, and the action selection region 101C corresponding to blocks, selection of which is completed. In the example of FIG. 18, the selection complete image 101N is, for example, an image representing a "check mark" but is not limited thereto and may be an image representing a figure motif such as a "circular motif" as on the applet production screen 101 exemplarily illustrated in FIG. 19. Alternatively, the processing unit 26 may indicate completion of block selection by inverting the colors of the service selection region 101A, the trigger selection region 101B, and the action selection region 101C corresponding to blocks, selection of which is completed as on the applet production screen 101 exemplarily illustrated in FIG. 20. The applet production screen 101 in FIG. 20 exemplarily illustrates a state in which selection of a service block is completed but selection of a trigger block and an action block is yet to be completed.

<Fifth Modification: Second Variation of Applet Production Screen>

Figure 21:
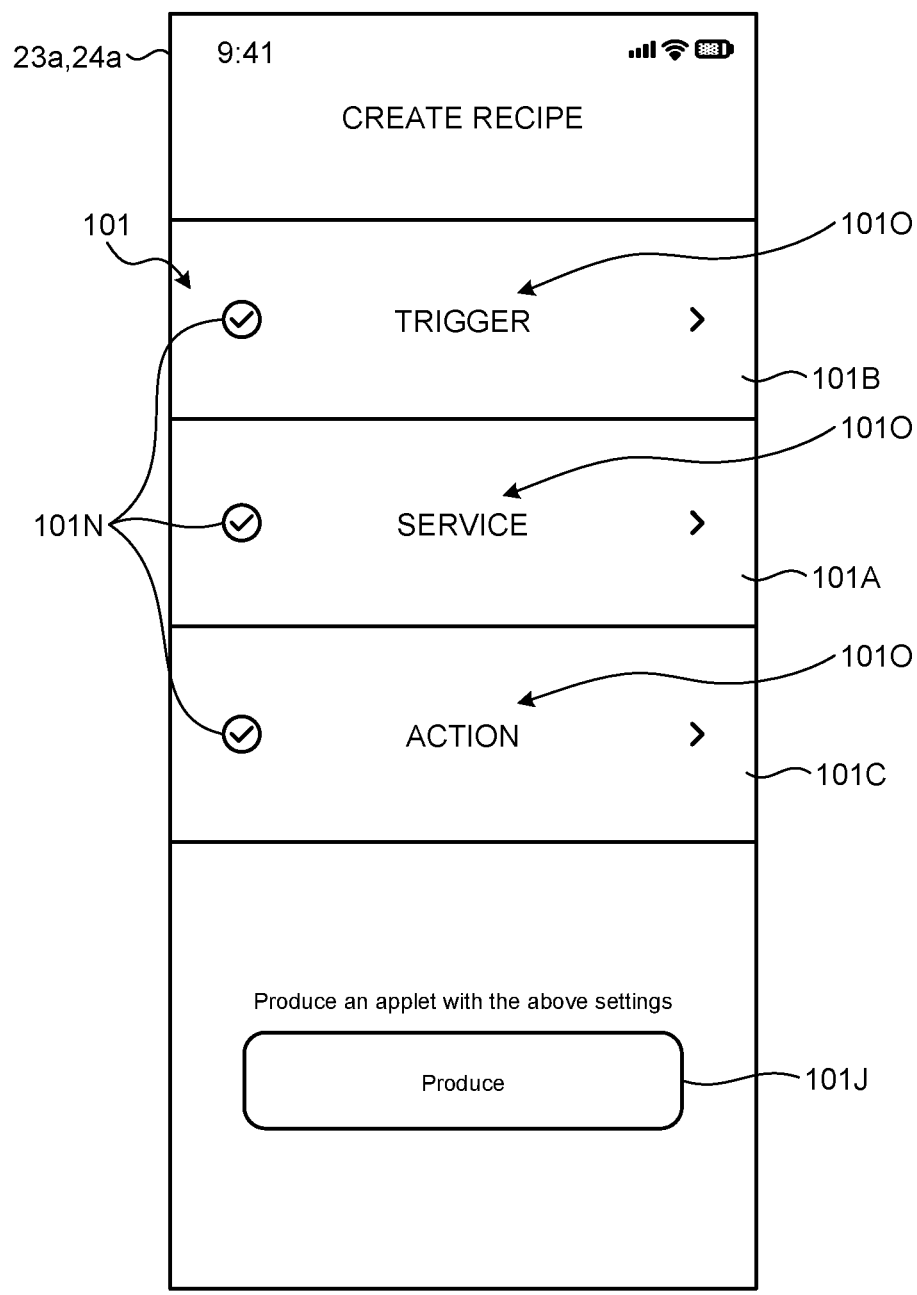
FIG. 21 is a diagram illustrating an exemplary display screen in the application program production by the computer program production system according to the modification.

The processing unit 26 may display the applet production screen 101 illustrated in FIG. 21 in place of the applet production screen 101 illustrated in FIG. 13, 18, 19, or 20. In this case, the processing unit 26 may not display icon images representing selected blocks, narrowing option images, nor the like in the service selection region 101A, the trigger selection region 101B, and the action selection region 101C of the applet production screen 101 illustrated in FIG. 21, but may display character images 101O of "SERVICE", "TRIGGER", "ACTION", and the like representing the respective regions.

In this case, as well, the computer program production system S1, the applet production program, and the production terminal instrument 20 can provide a sense of unity to the appearance of a screen on which an operation to start production of an applet is performed as described above, thereby more excellently producing an applet.

In this case, as well, the processing unit 26 may transition to a screen (for example, the detailed description screen 109 in FIG. 16) for detailed description of a selected block when any of the service selection region 101A, the trigger selection region 101B, and the action selection region 101C is selected in accordance with, for example, a tap operation on the touch panel 23a by the producer on the applet production screen 101 illustrated in FIG. 21. The processing unit 26 may display the selection complete images 101N in the service selection region 101A, the trigger selection region 101B, and the action selection region 101C corresponding to blocks, selection of which is completed on the applet production screen 101 illustrated in FIG. 21.

<Sixth Modification: Third Variation of Applet Production Screen>

The processing unit 26 may display an icon image optionally selected by the producer in the service selection region 101A, the trigger selection region 101B, and the action selection region 101C of the applet production screen 101 illustrated in, for example, FIG. 7, 10, or 13. In this case, in addition, the processing unit 26 may display an icon image optionally selected by the producer on, for example, the service selection screen 102 illustrated in FIG. 5, the trigger selection screen 104 illustrated in FIG. 8, and the action selection screen 106 illustrated in FIG. 11. In this case, the processing unit 26 causes the display 24a to display an image selection screen 111 as exemplarily illustrated in FIG. 22 when the new-production selection region 100A is selected in accordance with, for example, a tap operation on the touch panel 23a by the producer on, for example, the production-editing selection screen 100 illustrated in FIG. 3.

Figure 22:
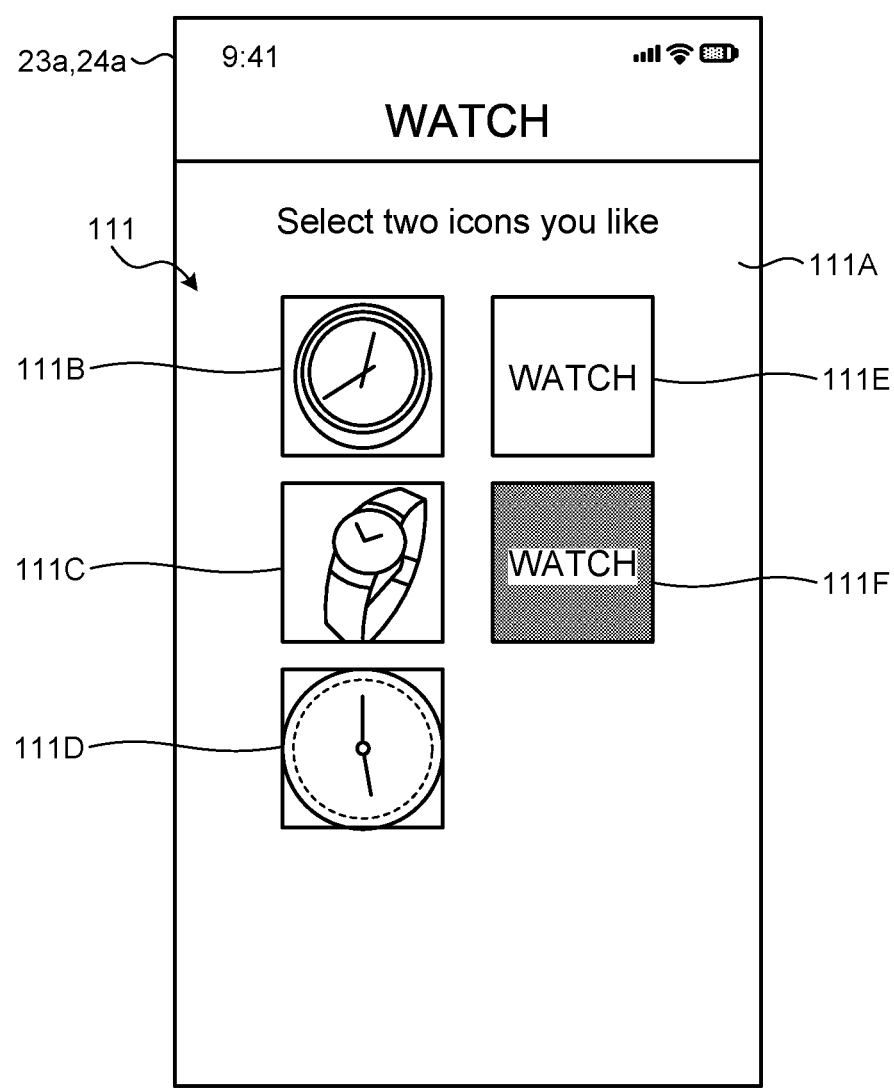
FIG. 22 is a diagram illustrating an exemplary display screen in the application program production by the computer program production system according to the modification.

The image selection screen 111 illustrated in FIG. 22 includes an icon selection region 111A. The icon selection region 111A is a region that is operated to select an icon image displayed on each screen and in which a plurality of kinds of icon images 111B, 111C, 111D, 111E, and 111F provided with various designs are displayed together with character images of "Select two icons you like" and the like. The processing unit 26 determines an icon image to be displayed on each screen when any of the icon images 111B, 111C, 111D, 111E, and 111F in the icon selection region 111A is selected in accordance with, for example, a tap operation on the touch panel 23a by the producer on the image selection screen 111 illustrated in FIG. 22.

Figure 23:
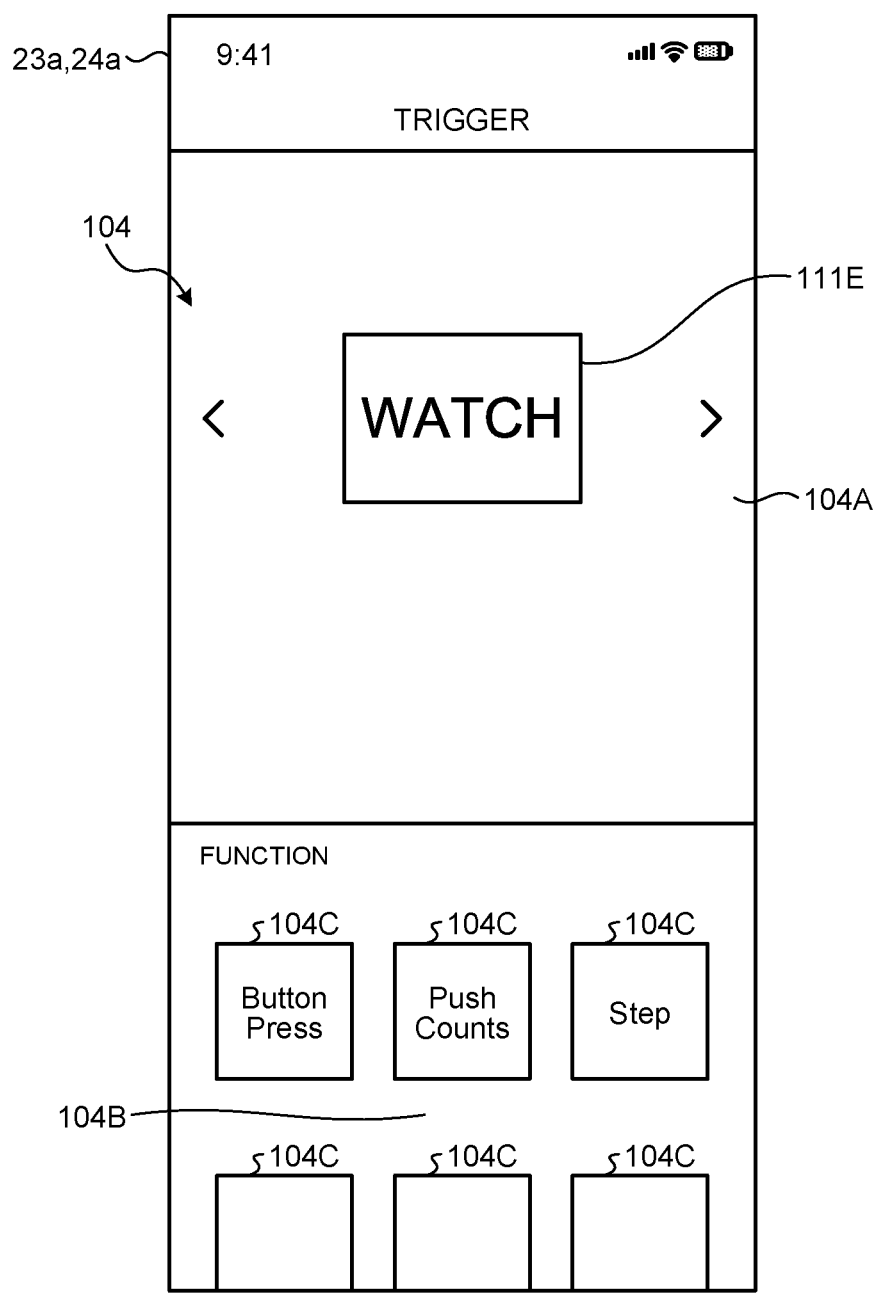
FIG. 23 is a diagram illustrating an exemplary display screen in the application program production by the computer program production system according to the modification.
Figure 24:
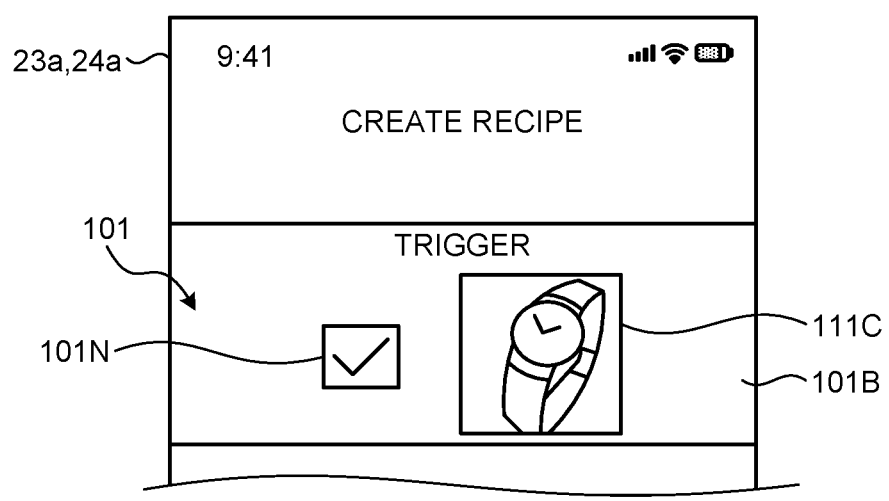
FIG. 24 is a diagram illustrating an exemplary display screen in the application program production by the computer program production system according to the modification.

FIG. 22 exemplarily illustrates the image selection screen 111 on which an icon image to be displayed on each screen is selected, for example, when "WATCH" is selected as an instrument at which a trigger is to be generated and an instrument at which an action is to be executed. For example, the processing unit 26 causes two icon images that the producer likes to be selected from among the icon images 111B, 111C, 111D, 111E, and 111F displayed in the icon selection region 111A of the image selection screen 111 illustrated in FIG. 22. Thereafter, the processing unit 26 causes the producer to optionally select, through a selection screen (not illustrated) or the like, a screen on which the two selected icon images among the icon images 111B, 111C, 111D, 111E, and 111F are to be displayed. FIG. 23 illustrates an example in which the icon image 111E selected from among the icon images 111B, 111C, 111D, 111E, and 111F is displayed in the trigger generation instrument selection region 104A of the trigger selection screen 104. FIG. 24 illustrates an example in which the icon image 111C selected from among the icon images 111B, 111C, 111D, 111E, and 111F is displayed in the trigger selection region 101B of the applet production screen 101.

The processing unit 26 may display various kinds of icon images optionally selected by the producer as described above in, for example, the service selection region 101A of the applet production screen 101 or the action execution instrument selection region of the action selection region 101C or the action selection screen 106.

The computer program production system S1, the applet production program, and the production terminal instrument 20 can express preferences of the producer in various manners on each screen by displaying icon images optionally selected by the producer on the screen as described above, thereby more excellently producing an applet. Accordingly, the computer program production system S1, the applet production program, and the production terminal instrument 20 can display icon images corresponding to blocks in a distinguished manner, for example, when a plurality of service blocks, a plurality of trigger blocks, and a plurality of action blocks are selected.

<Seventh Modification: Fourth Variation of Applet Production Screen>

Figure 25:
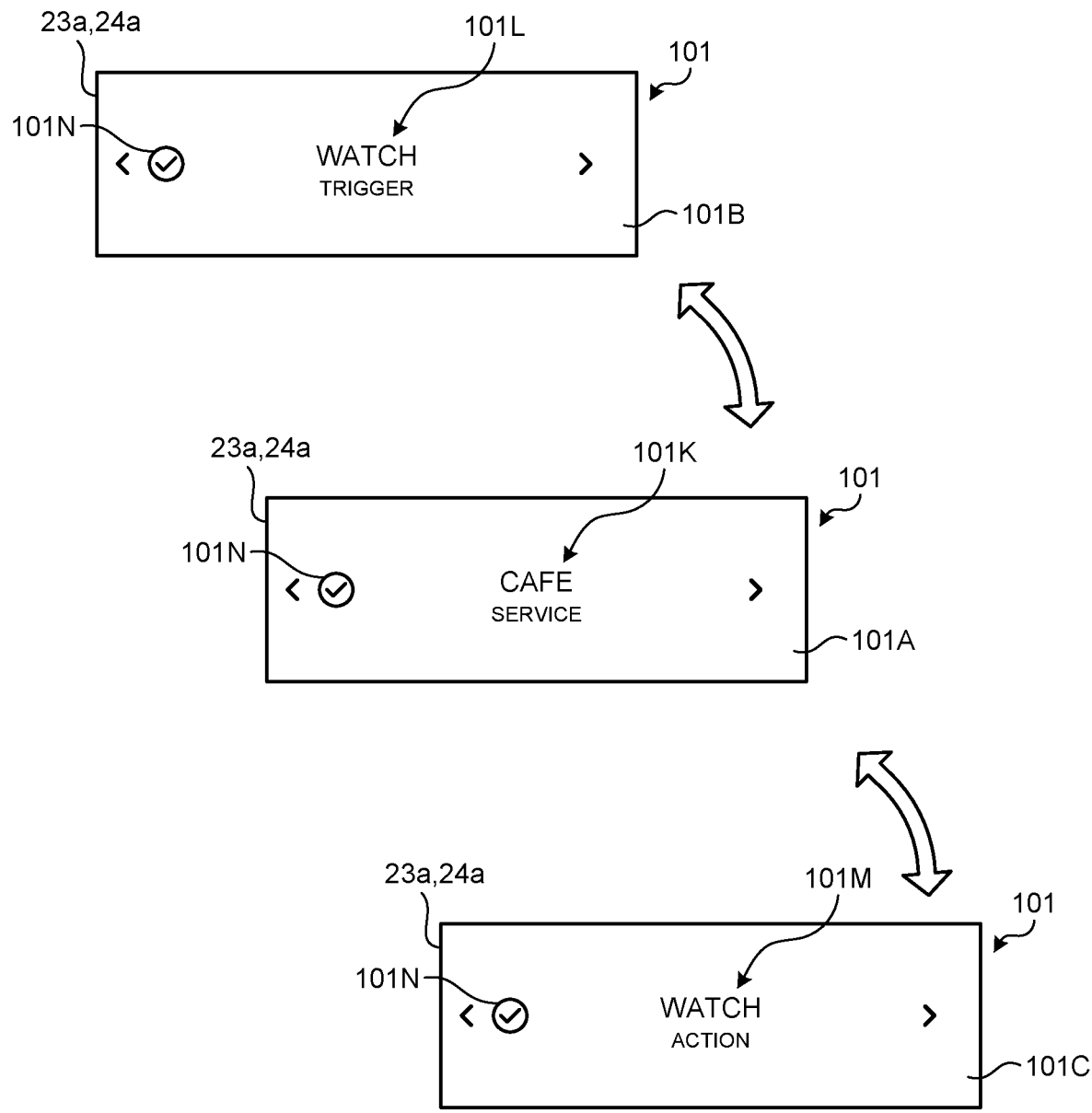
FIG. 25 is a diagram illustrating an exemplary display screen in the application program production by the computer program production system according to the modification.

The processing unit 26 may not collectively display the service selection region 101A, the trigger selection region 101B, and the action selection region 101C on the applet production screen 101 illustrated in, for example, FIG. 7, 10, or 13 but may display the regions as different screens. As exemplarily illustrated in FIG. 25, the processing unit 26 may sequentially slide and display the service selection region 101A, the trigger selection region 101B, and the action selection region 101C in a switching manner in accordance with a swipe operation on each region through the touch panel 23a and tap operations on arrow images "<" and ">" on the applet production screen 101.

The computer program production system S1, the applet production program, and the production terminal instrument 20 can display preferred icon images without worries about a sense of unity of, for example, icon images representing selected blocks by displaying the service selection region 101A, the trigger selection region 101B, and the action selection region 101C of the applet production screen 101 as different screens as described above. In addition, the computer program production system S1, the applet production program, and the production terminal instrument 20 can relatively reduce a space needed for display of the applet production screen 101.

The computer program production system, the computer program, and the production terminal instrument according to the present embodiment may be achieved by combining the components of the above-described embodiment and modifications as appropriate.

REFERENCE SIGNS LIST 10 external instrument
11 applet server
12 block server
13 product server
20 production terminal instrument
22 communication unit
23 input unit
24 output unit
24a display (display unit)
25 storage unit
26 processing unit
D operation target instrument
D1 electronic watch
S1 computer program production system

The invention claimed is:
1. A computer program production system comprising:
an external instrument configured to store production information for producing an application program configured to operate an operation target instrument; and
a production terminal instrument including
a communication unit configured to perform communication with the external instrument,
an input unit configured to receive an input from outside, and
a processing unit configured to execute processing of producing the application program in accordance with the input to the input unit based on the production information acquired from the external instrument through the communication unit, wherein
the application program includes
a service block program configured to define output information to be output from the operation target instrument,
a trigger block program configured to define contents of a trigger that invokes an action for outputting the output information, define a trigger generation unit that generates the trigger, and cause the trigger generation unit to generate the trigger, and
an action block program configured to define contents of the action for outputting the output information, define an action execution unit that executes the action, and cause the action execution unit to execute the action, and
the processing unit executes information acquisition processing of acquiring the production information from the external instrument through the communication unit, service block selection processing of selecting the service block program to be incorporated in the application program from among selection candidate service block programs as selection candidates for the service block program in accordance with the production information acquired by the information acquisition processing and the input to the input unit, trigger block selection processing of selecting the trigger block program to be incorporated in the application program from among selection candidate trigger block programs as selection candidates for the trigger block program in accordance with the production information acquired by the information acquisition processing and the input to the input unit, action block selection processing of selecting the action block program to be incorporated in the application program from among selection candidate action block programs as selection candidates for the action block program in accordance with the production information acquired by the information acquisition processing and the input to the input unit, and production processing of producing the application program by combining the service block program selected by the service block selection processing, the trigger block program selected by the trigger block selection processing, and the action block program selected by the action block selection processing.

2. The computer program production system according to claim 1, wherein the application program is stored in any of a plurality of the operation target instruments and causes the operation target instruments to cooperate with each other to perform generation of the trigger by the trigger generation unit, acquisition of the output information, and execution of the action by the action execution unit.

3. The computer program production system according to claim 2, wherein the production terminal instrument is also used as the operation target instrument, and the application program causes the production terminal instrument also used as the operation target instrument to perform at least one or all of generation of the trigger by the trigger generation unit, acquisition of the output information, and execution of the action by the action execution unit.

4. The computer program production system according to claim 3, wherein the processing unit executes the trigger block selection processing and the action block selection processing after the service block selection processing.

5. The computer program production system according to claim 2, wherein the processing unit executes the trigger block selection processing and the action block selection processing after the service block selection processing.

6. The computer program production system according to claim 2, wherein the information acquisition processing includes service block information acquisition processing of acquiring, as the production information, information related to the selection candidate service block programs, trigger block information acquisition processing of acquiring, as the production information, information related to the selection candidate trigger block programs in accordance with the operation target instrument, and action block information acquisition processing of acquiring, as the production information, information related to the selection candidate action block program in accordance with the operation target instrument.

7. The computer program production system according to claim 1, wherein the production terminal instrument is also used as the operation target instrument, and the application program causes the production terminal instrument also used as the operation target instrument to perform at least one or all of generation of the trigger by the trigger generation unit, acquisition of the output information, and execution of the action by the action execution unit.

8. The computer program production system according to claim 7, wherein the processing unit executes the trigger block selection processing and the action block selection processing after the service block selection processing.

9. The computer program production system according to claim 7, wherein the information acquisition processing includes service block information acquisition processing of acquiring, as the production information, information related to the selection candidate service block programs, trigger block information acquisition processing of acquiring, as the production information, information related to the selection candidate trigger block programs in accordance with the operation target instrument, and action block information acquisition processing of acquiring, as the production information, information related to the selection candidate action block program in accordance with the operation target instrument.

10. The computer program production system according to claim 1, wherein the processing unit executes the trigger block selection processing and the action block selection processing after the service block selection processing.

11. The computer program production system according to claim 10, wherein the information acquisition processing includes service block information acquisition processing of acquiring, as the production information, information related to the selection candidate service block programs, trigger block information acquisition processing of acquiring, as the production information, information related to the selection candidate trigger block programs in accordance with the operation target instrument, and action block information acquisition processing of acquiring, as the production information, information related to the selection candidate action block program in accordance with the operation target instrument.

12. The computer program production system according to claim 1, wherein the information acquisition processing includes service block information acquisition processing of acquiring, as the production information, information related to the selection candidate service block programs, trigger block information acquisition processing of acquiring, as the production information, information related to the selection candidate trigger block programs in accordance with the operation target instrument, and action block information acquisition processing of acquiring, as the production information, information related to the selection candidate action block program in accordance with the operation target instrument.

13. The computer program production system according to claim 12, wherein the processing unit executes product code transmission processing of transmitting a product code specifying a model of the operation target instrument to the external instrument through the communication unit, acquires, in the trigger block information acquisition processing, information related to the selection candidate trigger block programs in accordance with the product code transmitted by the product code transmission processing, and acquires, in the action block information acquisition processing, information related to the selection candidate action block program in accordance with the product code transmitted by the product code transmission processing.

14. The computer program production system according to claim 1, wherein the operation target instrument includes an electronic watch configured to display time.

15. The computer program production system according to claim 1, wherein the production terminal instrument includes a display unit controlled by the processing unit and capable of displaying an image, when selecting the service block program from among the selection candidate service block programs at the service block selection processing, the processing unit causes the display unit to display a service narrowing option image representing a service narrowing option for narrowing the selection candidate service block programs and an icon image representing each selection candidate service block program narrowed by the service narrowing option, when selecting the trigger block program from among the selection candidate trigger block programs at the trigger block selection processing, the processing unit causes the display unit to display a trigger narrowing option image representing a trigger narrowing option for narrowing the selection candidate trigger block programs, and an icon image representing each selection candidate trigger block program narrowed by the trigger narrowing option, when selecting the action block program from among the selection candidate action block programs at the action block selection processing, the processing unit causes the display unit to display an action narrowing option image representing an action narrowing option for narrowing the selection candidate action block program, and an icon image representing each selection candidate action block program narrowed by the action narrowing option, and the processing unit causes the display unit to display the service narrowing option image, the trigger narrowing option image, and the action narrowing option image and not to display the icon images on a screen on which an operation to start production of the application program is performed before the production processing after the service block selection processing, the trigger block selection processing, and the action block selection processing.

16. A computer program configured to cause a computer to execute:

information acquisition processing of acquiring, from an external instrument through a communication unit of the computer, production information for producing an application program configured to operate an operation target instrument, the application program including a service block program configured to define output information to be output from the operation target instrument, a trigger block program configured to define contents of a trigger that invokes an action for outputting the output information, define a trigger generation unit that generates the trigger, and cause the trigger generation unit to generate the trigger, and an action block program configured to define contents of the action for outputting the output information, define an action execution unit that executes the action, and cause the action execution unit to execute the action;

service block selection processing of selecting the service block program to be incorporated in the application program from among selection candidate service block programs as selection candidates for the service block program in accordance with the production information acquired by the information acquisition processing and an input to an input unit of the computer;

trigger block selection processing of selecting the trigger block program to be incorporated in the application program from among selection candidate trigger block programs as selection candidates for the trigger block program in accordance with the production information acquired by the information acquisition processing and the input to the input unit;

action block selection processing of selecting the action block program to be incorporated in the application program from among selection candidate action block programs as selection candidates for the action block program in accordance with the production information acquired by the information acquisition processing and the input to the input unit; and production processing of producing the application program by combining the service block program selected by the service block selection processing, the trigger block program selected by the trigger block selection processing, and the action block program selected by the action block selection processing.

17. The computer program according to claim 16, wherein the application program is stored in any of a plurality of the operation target instruments and causes the operation target instruments to cooperate with each other to perform generation of the trigger by the trigger generation unit, acquisition of the output information, and execution of the action by the action execution unit.

18. The computer program according to claim 16, wherein the computer is also used as the operation target instrument, and the application program causes the computer also used as the operation target instrument to perform at least one or all of generation of the trigger by the trigger generation unit, acquisition of the output information, and execution of the action by the action execution unit.

19. The computer program according to claim 16, wherein
when selecting the service block program from among the selection candidate service block programs at the service block selection processing, the computer program causes a display unit of the computer to display a service narrowing option image representing a service narrowing option for narrowing the selection candidate service block programs and an icon image representing each selection candidate service block program narrowed by the service narrowing option,
when selecting the trigger block program from among the selection candidate trigger block programs at the trigger block selection processing, the computer program causes the display unit to display a trigger narrowing option image representing a trigger narrowing option for narrowing the selection candidate trigger block programs and an icon image representing each selection candidate trigger block program narrowed by the trigger narrowing option,
when selecting the action block program from among the selection candidate action block programs at the action block selection processing, the computer program causes the display unit to display an action narrowing option image representing an action narrowing option for narrowing the selection candidate action block programs and an icon image representing each selection candidate action block program narrowed by the action narrowing option, and
the computer program causes the display unit to display the service narrowing option image, the trigger narrowing option image, and the action narrowing option image and not to display the icon images on a screen on which an operation to start production of the application program is performed before the production processing after the service block selection processing, the trigger block selection processing, and the action block selection processing.

20. A production terminal instrument comprising:
a communication unit configured to perform communication with an external instrument configured to store production information for producing an application program configured to operate an operation target instrument;
an input unit configured to receive an input from outside; and
a processing unit configured to execute processing of producing the application program in accordance with the input to the input unit based on the production information acquired from the external instrument through the communication unit, wherein
the application program includes
a service block program configured to define output information to be output from the operation target instrument,
a trigger block program configured to define contents of a trigger that invokes an action for outputting the output information, define a trigger generation unit that generates the trigger, and cause the trigger generation unit to generate the trigger, and
an action block program configured to define contents of the action for outputting the output information, define an action execution unit that executes the action, and cause the action execution unit to execute the action, and
the processing unit executes
information acquisition processing of acquiring the production information from the external instrument through the communication unit,
service block selection processing of selecting the service block program to be incorporated in the application program from among selection candidate service block programs as selection candidates for the service block program in accordance with the production information acquired by the information acquisition processing and the input to the input unit,
trigger block selection processing of selecting the trigger block program to be incorporated in the application program from among selection candidate trigger block programs as selection candidates for the trigger block program in accordance with the production information acquired by the information acquisition processing and the input to the input unit,
action block selection processing of selecting the action block program to be incorporated in the application program from among selection candidate action block programs as selection candidates for the action block program in accordance with the production information acquired by the information acquisition processing and the input to the input unit, and
production processing of producing the application program by combining the service block program selected by the service block selection processing, the trigger block program selected by the trigger block selection processing, and the action block program selected by the action block selection processing.

* * * * *